United States Patent [19]

Workman

[11] 4,181,822
[45] Jan. 1, 1980

[54] BANDSPLITTER SYSTEMS

[75] Inventor: Dennis L. Workman, Morgan Hill, Calif.

[73] Assignee: Bell & Howell Company, Chicago, Ill.

[21] Appl. No.: 884,462

[22] Filed: Mar. 7, 1978

[51] Int. Cl.² .......................... H04B 1/66; H04N 5/78
[52] U.S. Cl. .................... 179/15.55 R; 179/15 BW; 360/23; 358/134
[58] Field of Search .................. 179/15.55 T, 15 BW, 179/2 TS, 2 TV, 15.55 R; 358/133, 134, 138; 360/22, 23; 325/32, 34, 59, 61; 343/200; 332/41

[56] References Cited

U.S. PATENT DOCUMENTS

| | | | |
|---|---|---|---|
| 2,629,010 | 2/1953 | Graham | 358/134 |
| 2,760,011 | 8/1956 | Berry | 330/126 |
| 3,030,450 | 4/1962 | Schroeder | 179/15.55 R |
| 3,684,838 | 8/1972 | Kahn | 179/15.55 R |
| 3,806,640 | 4/1974 | Furukawa | 360/23 |
| 3,809,805 | 5/1974 | Kasprazak | 360/23 |
| 3,914,554 | 10/1975 | Seidel | 179/15 BW |

Primary Examiner—Thomas A. Robinson
Attorney, Agent, or Firm—Benoit Law Corporation

[57] ABSTRACT

Methods and apparatus for partitioning a wide-band signal into a plurality of separate narrow-band signals partition the wide-band signal into a low-frequency component and a high-frequency component at least partially above the low-frequency component in the spectrum of the wide-band signal. The low-frequency component is translated into a first narrow-band signal having a band of frequencies at least partially higher than the frequencies of the low-frequency component. The high-frequency component is partitioned into at least two separate further narrow-band signals, each having a bandwidth smaller than the bandwidth of the high-frequency component. Alternatively or additionally, sequential pluralities of elements (samples) of the wide-band signal are distributed over a plurality of groups, and each plurality of elements in each group is separately stored. Narrow-band signals are provided by separately releasing stored pluralities of elements from the groups in an at least partially time-coincident relationship.

152 Claims, 5 Drawing Figures

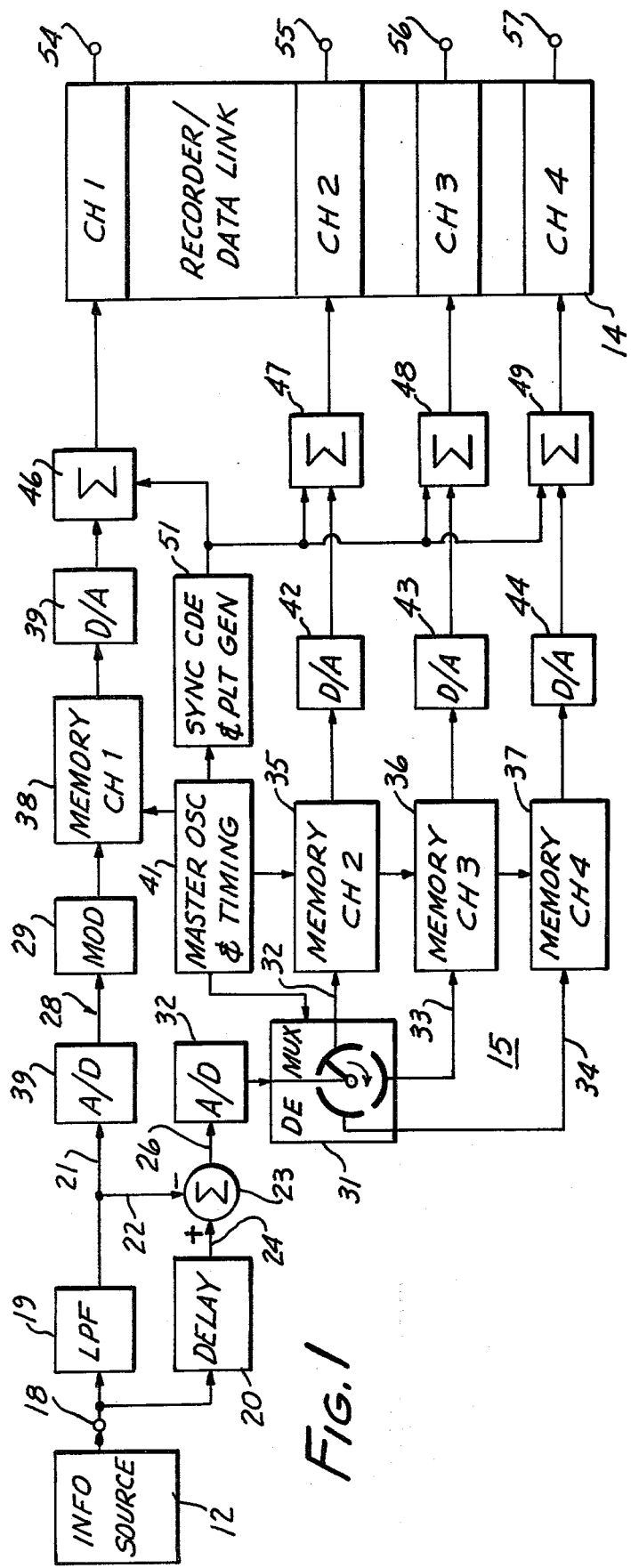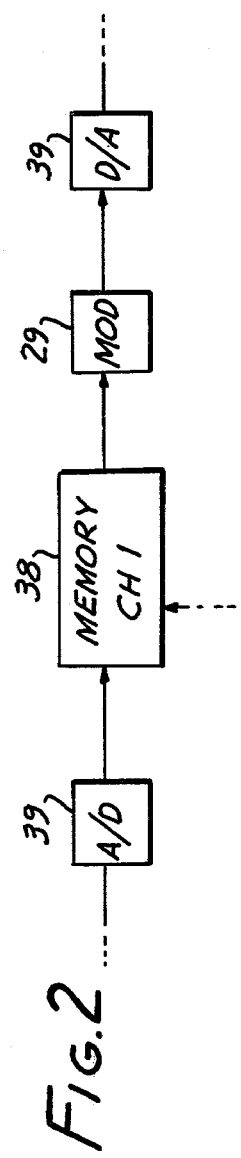

BANDSPLITTER SYSTEMS

BACKGROUND OF THE INVENTION

1. Field of the Invention

The subject invention relates to bandwidth partitioning systems and, more specifically, to bandsplitter systems for partitioning a wide-band signal into a plurality of separate narrow-band signals, as well as to systems for transferring a wide-band signal via a plurality of separate narrow-band signals, and systems for reproducing a wide-band signal from a plurality of separate narrow-band signals.

2. Prior-Art Statement

Method for carrying out bandsplitting and band-joining functions may be classified as either frequency division multiplexing (FDM), time division multiplexing (TDM), or a hybrid of the latter two species (FDM/TDM).

An example of frequency division multiplexing may be seen in U.S. Pat. No. 2,760,011, by C. E. Berry, issued August 21, 1956. In practice, the system disclosed by Berry is limited to two-channel frequency separating apparatus, which is often inadequate.

Another example of a frequency division multiplexing system may be seen in U.S. Pat. No. 3,061,684, by J. H. Lancor and C. E. Berry, issued Oct. 30, 1962. That system permits an input signal to be partitioned into a plurality of channels, using low-pass filters, including one or two low-pass filters for separating a low-frequency component from the input signal, differential amplifiers for extracting a high-frequency component from the input signal, and frequency translators, including local oscillators and mixers and, optionally, frequency dividers, for translating the high-frequency component into several low-frequency components for the second, third and possibly further channels.

In terms of systems architecture, a frequency division multiplexing system may be thought of, or implemented, in terms of a low-pass filter for the first channel and bandpass filters for the second, third and further channels, with a frequency translator being associated with each bandpass filter to reduce each band to a low-frequency component.

The architecture of the corresponding band-joining equipment would be characterized by timebase correction facilities for each channel, a frequency translator for each of the second, third and further channels for restoring the previously translated frequency band, and a summing component for restoring a reasonable approximation of the original wide-band signal from the time corrected and, as necessary, retranslated low-frequency components.

In practice, the number of necessary filter designs may be reduced by effecting frequency translation ahead of filtering in the second, third and further channels. However, this still leaves the requirement of a provision of at least as many filters as there are signal recording or transmission channels, and as many frequency translators as there are recording or transmission channels after the first channel.

Implementation of such requisite frequency translation may be effected with single-sideband modulators or doubly-balanced modulators. The single-sideband approach requires additional filtering for the removal of the undesired sideband. The doubly-balanced modulator approach requires a 90° phase splitter. Both techniques require a synchronous demodulation approach at the reproducer to avoid gross phase errors at the recombined band edges.

In practice, a standard analog approach using passive elements simply does not provide the bandedge stability required to prevent very significant amplitude ripple in the recombined pass-band. Additionally, the phase response at the bandedges in passive element systems requires equalization in order to have any chance of achieving a controlled phase characteristic at the bandedges.

Recent efforts have led to the conclusion that transversal filter designs represent the only implementation which can meet overall contemporary performance objectives. However, even transversal analog filters have to be rejected for their potentially degrading effect on the system noise power ratio. Recursive approaches have been investigated, but appear to suffer from some of the bandedge phase characteristics associated with passive analog designs. A transversal digital filter approach thus appears as the only viable filter candidate in frequency division multiplexing. However, a digital transversal filter approach would require a substantial hardware development in order to optimize the trade-off between electronic complexity and filter characteristics. It is extremely unlikely that a suitable filter shape could be synthesized without multipliers. In short, a digital transversal filter approach would satisfy system performance at the expense of substantial complexity.

The frequency translators required in conventional frequency division multiplexing systems also have their problems, and guardbands are required between signal channels to prevent distortion.

Accordingly, frequency division multiplexing approaches generally have come to be used for putting several uncorrelated low-band signals unto a single wide-band channel which will subsequently be demultiplexed to restore the individual low-band signals. In other words, the frequency division multiplexing approach has not come to be preferred for the partition of a wide-band signal into a plurality of separate narrow-band signals for subsequent recombination to a wide-band signal.

In principle, transform techniques appear to be similar to conventional frequency division multiplexing apparatus. Closer scrutiny, however, reveals some very significant differences. Consider, for example, a ten point discrete Fourier transform which is structured to perform the discrete Fourier transform on 10 sequential input data samples with the strategy of ultimately partitioning the transform coefficients among the ten recorder channels.

It is clear that any input signal which remains constant, whether this constancy is manifested as a fixed value of input voltage or some fixed frequency, will produce the same values for all of the transform coefficients. In the case of signal recording, an additional level of complexity is required in order to remedy the DC components generated by the transform, since the recording/playback channels cannot preserve a DC response.

Furthermore, computation of the transform itself will require digital circuitry exceeding in complexity the filters required by a frequency division multiplexing approach. In short, the transform technique is at least as complex as frequency division multiplexing before the problem of the DC manufacturing is even addressed. It may thus be said that transform techniques offer the same potential advantages as frequency division multiplexing, but are judged to be slightly inferior from an implementation viewpoint, at least pending technology development breakthroughs, particularly in the area of discrete Fourier transform large-scale integration.

With the advent of cathode ray storage devices, proposals arose to compress the bandwidth of an electric signal by writing the signal with first cathode ray means at a first velocity onto a storage medium and by reading the signal from the storage medium with second cathode ray means at a second velocity lower than the first velocity. Initially, it was proposed to effect the writing and reading steps along conforming linear or circular trajectories. As pointed out in Swiss Patent No. 342,605, an undistorted reproduction of the stored signal was only guaranteed if the reading process proceeded exactly along the writing trajectory. As that Swiss patent further points out, such a condition is hardly realizable, even with high-quality equipment, since inaccuracies in the trajectory are inevitable at high cathode ray velocities.

The related Swiss Patent No. 350,021 confirms these problems and points to the difficulties of a sufficiently accurate spatial and temporal coordination of the traces of the writing and reading electron beams on the storage medium, as well as to the special problems of a sufficient decoupling between writing and reading beams.

The Swiss Patents Nos. 342,605 and 343,451, therefore, proposed a system wherein one or both of the writing and reading beams were subjected to an intensity-modulated deflection in a direction perpendicularly to the mean direction of travel of the beams, while the related Swiss Patent No. 342,606 proposed a special electrode architecture for the storage medium, with spatially separate reading and writing beam trajectories.

These prior-art approaches rendered the above mentioned cathode ray devices potentially suitable for a bandwidth compression of radar echo pulses and radar plots, since radar information is characterized by recurring signals that can conveniently be added by a transversely oscillating or ribbon-shaped reading beam. In addition to the above mentioned patents, reference may in this respect also be had to Swiss Patent Nos. 342,264 and 349,307 dealing with the bandwidth compression of radar screen images utilizing the above mentioned principles.

In line with this prior-art approach, one could partition a wide-band signal into a plurality of low-band signals by writing the wide-band signal with a high-speed electron beam onto a storage medium and by continuously reading that recorded signal with a plurality of separate cathode ray reading beams moving at a slower velocity. Such an approach, however, would be burdened by the above mentioned practical impossibility of an undistorted reproduction and adequate time/space coordination of the writing and reading beams.

In consequence, the development of bandsplitter systems has for years proceeded on the basis of solid state technology.

For instance, a conventional time division multiplexing system architecture would employ solid-state samplers for distributing elements of the wide-band signal over several channels. For instance, one sampler may be employed for each channel, and such sampler may be driven to take turns on succeeding elements of the wide-band signal. After recording and playback, transmission or other transfer of the narrow-band signals in the various channels, a timebase correction is effected in each channel and the wide-band signal is reconstructed with the aid of further samplers.

This basically simple architecture has a severe problem. Simply stated, the problem is that each of the sampler outputs is constant whenever the input is either constant (e.g. a fixed voltage value) or has a frequency which is an integral submultiple of the composite sampling rate. For example, if the composite sampling rate is 5 MHz, then the output of each of, say, 10 samplers will be a constant value at frequencies of 500 kHz, 1 MHz, 1.5 MHz, 2 MHz, and 2.5 MHz, and also in the case of a direct-current input.

In cases where the data transfer channels are magnetic tape recording channels or are otherwise unable to sustain or transmit a direct-current response, holes will be created in the output spectrum at each of the latter submultiple frequencies and also for direct-current inputs. The regions neighboring such holes have a relatively gradual slope, and even frequencies that are located at a distance from the holes in the frequency spectrum experience a serious attenuation. In practice, the presently discussed time division multiplexing approach has been considered entirely unacceptable.

In this respect, the above mentioned U.S. Pat. No. 2,760,011, by Berry, prefers employment of a carrier-type direct-current amplifier as the low-frequency amplifier in two of its embodiments. The carrier-type amplifier comprises a conventional alternating-current amplifier having a modulator coupled to its input and having a demodulator coupled to its output. A carrier supply actuates the modulator and the demodulator in synchronism. Ordinarily, the modulator and the demodulator are synchronous choppers which are actuated by a source of alternating current which is the carrier supply.

SUMMARY OF THE INVENTION

It is a general object of this invention to overcome the above mentioned disadvantages.

It is a related object of this invention to provide improved methods and apparatus for facilitating the transmission, recording and other transfer of wide-band signals.

It is a germane object of this invention to provide improved methods and apparatus for partitioning a wide-band signal into a plurality of separate narrow-band signals.

It is also an object of this invention to provide improved methods and apparatus for transferring a wide-band signal via a plurality of separate narrow-band signals or channels.

It is also an object of this invention to provide improved methods and apparatus for reproducing a wide-band signal from a plurality of separate narrow-band signals.

It is a germane object of this invention to provide improved methods and apparatus for reproducing a wide-band signal from a plurality of signals received through narrow-band channels.

It is a germane object of this invention to provide improved bandsplitting and band-joining methods, apparatus and systems.

It is a germane object of this invention to reduce potential timebase errors between adjacent output samples of transmission, recording/playback or other data transfer channels conducting or carrying a plurality of narrow-band signals reconstructable into a wide-band signal.

It is a related object of this invention to provide improved apparatus, methods and techniques for restoring or reconstructing a wide-band signal from a plurality of partitioned narrow-band signals.

It is a germane object of this invention to provide improved apparatus, methods and techniques for accommodating, is transmitted, recorded and reproduced or otherwise transferred narrow-band signals, information for restoring a wide-band signal.

It is a related object of this invention to reduce channel-to-channel gain variation in the transfer and processing of separate narrow-band signals reconstructible to a wide-band signal.

It is a related object of this invention to eliminate a direct-current content in all but one data transfer channel of a bandsplitter system.

It is a germane object of this invention to eliminate any direct-current content in all channels of a bandsplitter system.

It is also a broad object of this invention to provide improved methods, apparatus and systems for facilitating the transmission, recording, playback and other transfer of information.

Other objects will become apparent in the further course of this disclosure.

From one aspect thereof, the subject invention resides in a method of partitioning a wide-band signal into a plurality of separate narrow-band signals.

The expressions "wide-band signal" and "narrow-band signals" are relative terms indicating in its broadest significance that each of the narrow-band signals extends over a narrower band of frequencies than the wide-band signal. Typically, the narrow-band signals are signals as obtained from splitting the band of a wide-band signal.

The method under consideration comprises in combination a number of steps recited herein in a certain sequence. However, this is not to say that any combination of steps herein disclosed necessarily has to proceed in the sequence in which it has been recited, as long as a disclosed method would not become inoperative by pursuing a different sequence of the steps of the particular combination.

One of the steps of the method under consideration is the step of partitioning the wide-band signal into a low-frequency component and a high-frequency component. Again, the expressions "low-frequency component" and "high-frequency component" are relative terms, indicating that the component designated as "high-frequency component" is at least partially above the low-frequency component in the spectrum of the wide-band signal.

Another step of the method presently under consideration is the step of translating the low-frequency component into a first narrow-band signal having a band of frequencies at least partially higher than the frequencies of the low-frequency component. In this manner, the direct-current problem is eliminated from the first narrow-band signal or, perhaps more accurately, from the transfer channel which transmits or receives that first narrow-band signal.

Another step of the method under consideration is the step of distributing sequential pluralities of elements of the high-frequency component over (n−1) groups, with n being equal to the number of the plurality of separate narrow-band signals into which the wide-band signal is partitioned. Each plurality of elements in each group is separately stored. Separate narrow-band signals are provided in addition to the above mentioned narrow-band signals by releasing stored pluralities of elements from the mentioned groups in an at least partially time-coincident relationship, typically at a rate which is lower than the rate at which the pluralities of elements have been stored.

In accordance with a preferred embodiment of the subject invention, the low-frequency component is translated into the first narrow-band signal by modulation on a carrier.

In accordance with what is presently considered the best mode of carrying the subject invention into effect, each plurality of elements in each of the above mentioned groups is stored separately in a storage operation distinct from the above mentioned distribution of sequential pluralities of elements. This is clearly distinct from the principle of the above mentioned Swiss patent wherein the distribution of elements of the wide-band signal or high-frequency component takes place on the same storage medium and physically with the same electron beam as the signal element storage operation.

In accordance with a further preferred embodiment of the subject invention, either the above mentioned low-frequency component or the first narrow-band signal is stored, and is released in an at least partially time-coincident relationship with the narrow-band signals.

Also in accordance with a preferred embodiment of the subject invention time gaps are provided in each of the separate narrow-band signals between released pluralities of elements, and information for restoring the wide-band signal from the narrow-band signals is provided in such time gaps.

These preferred embodiments and other features herein disclosed may also be combined with other aspects of the subject invention presently to be disclosed herein.

From another aspect thereof, the subject invention resides in a method of partitioning a wide-band signal into a plurality of separate narrow-band signals, comprising in combination the steps of partitioning the wide-band signal into a low-frequency component and a high-frequency component at least partially above low-frequency component in the spectrum of said wide-band signal, translating said low-frequency component into a first narrow-band signal, distributing sequential pluralities of elements of said high-frequency component over (n−1) groups, with n being equal to the number of said plurality of separate narrow-band signals, separately storing each plurality of elements in each group, providing separate further narrow-band signals in addition to said first narrow-band signal by releasing stored pluralities of elements from said groups in an at least partially time-coincident relationship, and placing said first narrow-band signal into an at least partially time-coincident relationship with said further narrow-band signals.

From another aspect thereof, the subject invention resides in a method of partitioning a wide-band signal into a plurality of separate narrow-band signals, comprising in combination the steps of partitioning the wide-band signal into a low-frequency component and a high-frequency component at least partially above said low-frequency component in the spectrum of said wide-band signal, translating said low-frequency component into an alternating-current signal having a band of frequencies at least partially higher than the frequencies of said low-frequency component and narrower than the spectrum of said wide-band signal, storing sequential pluralities of elements of said alternating-current signal, releasing said stored sequential pluralities of elements of said alternating-current signal to provide a first narrow-band signal, distributing sequential pluralities of elements of said high-frequency component over (n−1) groups, with n being equal to the number of said plurality of separate narrow-band signals, separately storing each plurality of elements in each group, and providing separate narrow-band signals in addition to said first narrow-band signal by releasing stored pluralities of elements from said groups in an at least partially time-coincident relationship.

From another aspect thereof, the subject invention resides in a method of partitioning a wide-band signal into a plurality of separate narrow-band signals, comprising in combination the steps of partitioning the wide-band signal into a low-frequency component and a high-frequency component at least partially above said low-frequency component in the spectrum of said wide-band signal, storing sequential pluralities of elements of said low-frequency component, releasing said stored sequential pluralities of elements of said low-frequency component, translating said released sequential pluralities of elements of said low-frequency component into a first narrow-band signal having a band of frequencies at least partially higher than the frequencies of said low-frequency component, distributing sequential pluralities of elements of said high-frequency component over (n−1) groups, with n being equal to the number of said plurality of separate narrow-band signals, separately storing each plurality of elements in each group, and providing separate narrow-band signals in addition to said first narrow-band signal by releasing stored pluralities of elements from said groups in an at least partially time-coincident relationship.

From another aspect thereof, the subject invention resides in a method of partitioning a wide-band signal into a plurality of separate narrow-band signals, comprising in combination the steps of partitioning the wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, and partitioning said high-frequency component into at least two separate further narrow-band signals each having a bandwidth smaller than the bandwidth of said high-frequency component.

From another aspect thereof, the subject invention resides in a method of partitioning a wide-band signal into a plurality of separate narrow-band signals, comprising in combination the steps of distributing sequential pluralities of elements of said wide-band signal over a plurality of groups in a distribution operation, separately storing each plurality of elements in each group in a storage operation distinct from said distribution operation, and providing separate narrow-band signals by separately releasing stored pluralities of elements from said groups in an at least partially time-coincident relationship.

From another aspect thereof, the subject invention resides in a method transferring a wide-band signal via a plurality of separate narrow-band signals, comprising in combination the steps of partitioning the wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, distributing sequential pluralities of elements of said high-frequency component over (n−1) groups, with n being equal to the number of said plurality of separate narrow-band signals, separately storing each plurality of elements in each group, providing separate further narrow-band signals in addition to said first narrow-band signal by releasing stored pluralities of elements from said groups in an at least partially time-coincident relationship, transferring said first and further narrow-band signals through data channels, receiving said transferred first and further narrow-band signals from said data channels, and reproducing said wide-band signal from said received first and further narrow-band signals.

From another aspect thereof, the subject invention resides in a method of transferring a wide-band signal via a plurality of separate narrow-band signals, comprising in combination the steps of partitioning the wide-band signal into a low-frequency component and a high-frequency component at least partially above said low-frequency component in the spectrum of said wide-band signal, translating said low-frequency component into a first narrow-band signal, distributing sequential pluralities of elements of said high-frequency component over (n−1) groups, with n being equal to the number of said plurality of separate narrow-band signals, separately storing each plurality of elements in each group, providing separate further narrow-band signals in addition to said first narrow-band signal by releasing stored pluralities of elements from said groups in an at least partially time-coincident relationship, placing said first narrow-band signal into an at least partially time-coincident relationship with said further narrow-band signals, transferring said at least partially time-coincident first and further narrow-band signals through data channels, receiving said transferred first and further narrow-band signals from said data channels, and reproducing said wide-band signal from said received first and further narrow-band signals.

From another aspect thereof, the subject invention resides in a method of transferring a wide-band signal via a plurality of separate narrow-band signals, comprising in combination the steps of partitioning the wide-band signal into a low-frequency component and a high-frequency component at least partially above said low-frequency component in the spectrum of said wide-band signal, translating said low-frequency component into an alternating current signal having a band of frequencies at least partially higher than the frequencies of said low-frequency component and narrower than the spectrum of said wide-band signal, storing sequential pluralities of elements of said alternating-current signal, releasing said stored sequential pluralities of elements of said alternating-current signal to provide a first narrow-band signal, distributing sequential pluralities of elements of said high-frequency component over (n−1) groups, with n being equal to the number of said plurality of separate narrow-band signals, separately storing each plurality of elements in each group, providing separate further narrow-band signals in addition to said first narrow-band signal by releasing stored pluralities of elements from said groups in an at least partially time-coincident relationship, transferring said first and further narrow-band signals through data channels, receiving said transferred first and further narrow-band signals from said data channels, and reproducing said wide-band signal from said received first and further narrow-band signals.

From another aspect thereof, the subject invention resides in a method of transferring a wide-band signal via a plurality of separate narrow-band signals, comprising in combination the steps of partitioning the wide-band signal into a low-frequency component and a high-frequency component at least partially above said low-frequency component in the spectrum of said wide-band signal, storing sequential pluralities of elements of said low-frequency component, releasing said stored sequential pluralities of elements of said low-frequency component, translating said released sequential pluralities of elements of said low-frequency component into a first narrow-band signal having a band of frequencies at least partially higher than the frequencies of said low-frequency component, distributing sequential pluralities of elements of said high-frequency component over (n−1) groups, with n being equal to the number of said plurality of separate narrow-band signals, separately storing each plurality of elements in each group, providing separate further narrow-band signals in addition to said first narrow-band signal by releasing stored pluralities of elements from said groups in an at least partially time-coincident relationship, transferring said first and further narrow-band signals through data channels, receiving said transferred first and further narrow-band signals from said data channels, and reproducing said wide-band signal from said received first and further narrow-band signals.

From another aspect thereof, the subject invention resides in a method of transferring a wide-band signal via a plurality of separate narrow-band signals, comprising in combination the steps of partitioning the wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, partitioning said high-frequency component into at least two separate further narrow-band signals each having a bandwidth smaller than the bandwidth of said high-frequency component, transferring said first and further narrow-band signals through data channels, receiving said transferred first and further narrow-band signals from said data channels, and reproducing said wide-band signal from said received first and further narrow-band signals.

From another aspect thereof, the subject invention resides in a method of transferring a wide-band signal via a plurality of separate narrow-band signals, comprising in combination the steps of distributing sequential pluralities of elements of said wide-band signal over a plurality of groups in a distribution operation, separately storing each plurality of elements in each group in a storage operation distinct from said distribution operation, providing separate narrow-band signals by releasing stored pluralities of elements from said groups in an at least partially time-coincident relationship, transferring said separate narrow-band signals through data channels, receiving said transferred narrow-band signals from said data channels, and reproducing said wide-band signal from said received narrow-band signals.

From another aspect thereof, the subject invention resides in a method of reproducing a wide-band signal from a plurality of separate narrow-band signals obtained by partitioning a wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, distributing sequential pluralities of elements of said high-frequency component over (n−1) groups with n being equal to the number of said plurality of separate narrow-band signals, separately storing each plurality of elements in each group, and providing separate narrow-band signals in addition to said first narrow-band signal by releasing stored pluralities of elements from said groups in an at least partially time-coincident relationship, with said first and further narrow-band signals having been transferred through data channels.

The method according to the latter aspect of the subject invention comprises the steps of receiving said transferred first and further narrow-band signals from said data channels, retranslating said received first narrow-band signal into a resulting low-frequency component, separately storing pluralities of elements of said received further narrow-band signals, releasing and combining stored pluralities of elements of said received further narrow-band signals to restore said high-frequency component, and restoring said wide-band signal by combining said restored high-frequency component with said resulting low-frequency component.

From another aspect thereof, the subject invention resides in a method of reproducing a wide-band signal from a plurality of separate narrow-band signals, obtained by partitioning a wide-band signal into a low-frequency component and a high-frequency component at least partially above said low-frequency component in the spectrum of said wide-band signal, translating said low-frequency component into an alternating-current signal having a band of frequencies at least partially higher than the frequencies of said low-frequency component and narrower than the spectrum of said wide-band signal, storing sequential pluralities of elements of said alternating-current signal, releasing said stored sequential pluralities of elements of said alternating-current signal to provide a first narrow-band signal, distributing sequential pluralities of elements of said high-frequency component over (n−1) groups, with n being equal to the number of said plurality of separate narrow-band signals, separately storing each plurality of elements in each group, and providing separate further narrow-band signals in addition to said first narrow-band signal by releasing stored pluralities of elements from said groups in an at least partially time-coincident relationship, with said first and further narrow-band signals having been transferred through data channels.

The method according to the latter aspect of the subject invention comprises the steps of receiving said transferred first and further narrow-band signals, separately storing pluralities of elements of said received first and further narrow-band signals, separately releasing said stored pluralities of elements of said received first and further narrow-band signals, translating released pluralities of elements of the received first narrow-band signal into a resulting low-frequency component, combining released pluralities of elements of the received further narrow-band signals to restore said high-frequency component, and restoring said wide-band signal by combining said restored high-frequency component with said resulting low-frequency component.

From another aspect thereof, the subject invention resides in a method of reproducing a wide-band signal from a plurality of separate narrow-band signals, obtained by partitioning a wide-band signal into a low-frequency component and a high-frequency component at least partially above said low-frequency component in the spectrum of said wide-band signal, storing sequential pluralities of elements of said low-frequency component, releasing said stored sequential pluralities of elements of said low-frequency component, translating said released sequential pluralities of elements of said low-frequency component into a first narrow-band signal having a band of frequencies at least partially higher than the frequencies of said low-frequency component, distributing sequential pluralities of elements of said high-frequency component over (n−1) groups, with n being equal to the number of said plurality of separate narrow-band signals, separately storing each plurality of elements in each group, and providing separate further narrow-band signals in addition to said first narrow-band signal by releasing stored pluralities of elements from said groups in an at least partially time-coincident relationship, with said first and further narrow-band signals having been transferred through data channels.

The method according to the latter aspect of the subject invention comprises the steps of receiving said transferred first and further narrow-band signals, re-translating said received first narrow-band signal into a low-frequency component, separately storing pluralities of elements of said low-frequency component and of said received further narrow-band signals, separately releasing pluralities of elements of said stored low-frequency component and further narrow-band signals in an at least partially time-coincident relationship, combining released pluralities of elements of the received further narrow-band signals to restore said high-frequency component, and restoring said wide-band signal by combining said restored high-frequency component with said released low-frequency component.

From another aspect thereof, the subject invention resides in a method of reproducing a wide-band signal from a plurality of separate narrow-band signals obtained by partitioning a wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, and partitioning said high-frequency component into at least two separate further narrow-band signals each having a bandwidth smaller than the bandwidth of said high-frequency component, with said first annd further narrow-band signals having been transferred through data channels.

The method according to the latter aspect of the subject invention comprises the steps of receiving said transferred first and further narrow-band signals from said data channels, retranslating said received first narrow-band signal into a resulting low-frequency component, recombining said received further narrow-band signals into a high-frequency component, and combining said resulting low-frequency component and recombined high-frequency component into a wide-band signal.

From another aspect thereof, the subject invention resides in a method of reproducing a wide-band signal from a plurality of separate narrow-band signals obtained by distributing sequential pluralities of elements of said wide-band signal over a plurality of groups, separately storing each plurality of elements in each group, and releasing stored pluralities of elements from said groups in an at least partially time-coincident relationship to provide said separate narrow-band signals, with said separate narrow-band signals having been transferred through data channels.

The method according to the latter aspect of the subject invention comprises the steps of receiving said transferred separate narrow-band signals, separately storing pluralities of elements of said received narrow-band signals, and releasing and combining stored pluralities of elements of said received narrow-band signals to restore said wide-band signal.

From another aspect thereof, the subject invention resides in apparatus for partitioning a wide-band signal into a plurality of separate narrow-band signals, comprising, in combination, means for partitioning the wide-band signal into a low-frequency component and a high-frequency component at least partially above said low-frequency component in the spectrum of said wide-band signal, means connected to said partitioning means for translating said low-frequency component into a first narrow-band signal having a band of frequencies at least partially higher than the frequencies of said low-frequency component, means connected to said partitioning means for distributing sequential pluralities of elements of said high-frequency component over (n−1) groups, with n being equal to the number of said plurality of separate narrow-band signals, means connected to said distributing means for separately storing each plurality of elements in each group, and means connected to said storing means for providing separate narrow-band signals in addition to said first narrow-band signal by releasing stored pluralities of elements from said groups in an at least partially time-coincident relationship.

From another aspect thereof, the subject invention resides in apparatus for partitioning a wide-band signal into a plurality of separate narrow-band signals, comprising, in combination, means for partitioning the wide-band signal into a low-frequency component and a high-frequency component at least partially above said low-frequency component in the spectrum of said wide-band signal, means connected to said partitioning means for translating said low-frequency component into a first narrow-band signal, means connected to said partitioning means for distributing sequential pluralities of elements of said high-frequency component over (n−1) groups, with n being equal to the number of said plurality of separate narrow-band signals, means connected to said distributing means for separately storing each plurality of elements in each group, means connected to said storing means for providing separate further narrow-band signals in addition to said first narrow-band signal by releasing stored pluralities of elements from said groups in an at least partially time-coincident relationship, and means connected to said translating means for placing said first narrow-band signal into an at least partially time-coincident relationship with said further narrow-band signals.

From another aspect thereof, the subject invention resides in apparatus for partitioning a wide-band signal into a plurality of separate narrow-band signals, comprising, in combination, means for partitioning the wide-band signal into a low-frequency component and a high-frequency component at least partially above said low-frequency component in the spectrum of said wide-band signal, means connected to said partitioning means for translating said low-frequency component into an alternating-current signal having a band of frequencies at least partially higher than the frequencies of said low-frequency component and narrower than the spectrum of said wide-band signal, means connected to said translating means for storing sequential pluralities of elements of said alternating-current signal, means connected to said storing means for releasing said stored sequential pluralities of elements of said alternating-current signal to provide a first narrow-band signal, means connected to said partitioning means for distributing sequential pluralities of elements of said high-frequency component over (n−1) groups, with n being equal to the number of said plurality of separate narrow-band signals, means connected to said distributing means for separately storing each plurality of elements in each group, and means connected to the latter storing means for providing separate narrow-band signals in addition to said first narrow-band signal by releasing stored pluralities of elements from said groups in an at least partially time-coincident relationship.

From another aspect thereof, the subject invention resides in apparatus for partitioning a wide-band signal into a plurality of separate narrow-band signals, comprising, in combination, means for partitioning the wide-band signal into a low-frequency component and a high-frequency component at least partially above said low-frequency component in the spectrum of said wide-band signal, means connected to said partitioning means for storing sequential pluralities of elements of said low-frequency component, means connected to said storing means for releasing said stored sequential pluralities of elements of said low-frequency component, means connected to said storing means for translating said released sequential pluralities of elements of said low-frequency component innto a first narrow-band signal having a band of frequencies at least partially higher than the frequencies of said low-frequency component, means connected to said partitioning means for distributing sequential pluralities of elements of said high-frequency component over (n−1) groups, with n being equal to the number of said plurality of separate narrow-band signals, means connected to said distributing means for separately storing each plurality of elements in each group, and means connected to the latter storing means for providing separate narrow-band signals in addition to said first-narrow-band signal by releasing stored pluralities of elements from said groups in an at least partially time-coincident relationship.

From another aspect thereof, the subject invention resides in apparatus for partitioning a wide-band signal into a plurality of separate narrow-band signals, comprising, in combination, means for partitioning the wide-band signal into a low-frequency component and a high-frequency component at least partially above said low-frequency component in the spectrum of said wide-band signal, means connected to said partitioning means for translating said low-frequency component into a first narrow-band signal having a band of frequencies at least partially higher than the frequencies of said low-frequency component, and means connected to said partitioning means for partitioning said high-frequency component into at least two separate further narrow-band signals each having a bandwidth smaller than the bandwidth of said high-frequency component.

From another aspect thereof, the subject invention resides in apparatus for partitioning a wide-band signal into a plurality of separate narrow-band signals, comprising, in combination, means for distributing sequential pluralities of elements of said wide-band signal over a plurality of groups in a distribution operation, means connected to said distributing means for separately storing each plurality of elements in each group in a storage operation distinct from said distribution operation, and means connected to said storing means for providing separate narrow-band signals by separately releasing stored pluralities of elements from said groups in an at least partially time-coincident relationship.

From another aspect thereof, the subject invention resides in apparatus for transferring a wide-band signal via a plurality of separate data channels, comprising, in combination, means for partitioning the wide-band signal into a low-frequency component and a high-frequency component at least partially above said low-frequency component in the spectrum of said wide-band signal, means connected to said partitioning means for translating said low-frequency component into a first narrow-band signal having a band of frequencies at least partially higher than the frequencies of said low-frequency component, means connected to said partitioning means for distributing sequential pluralities of elements of said high-frequency component over (n−1) groups, with n being equal to the number of said plurality of separate narrow-band signals, means connected to said distributing means for separately storing each plurality of elements in each group, means connected to said storing means for providing separate further narrow-band signals in addition to said first narrow-band signal by releasing stored pluralities of elements from said groups in an at least partially time-coincident relationship, means connected to said translating means and said further narrow-band signal providing means for transferring said first and further narrow-band signals through said separate data channels, means connected to said data channels for receiving said transferred first and further narrow-band signals from said data channels, and means connected to said receiving means for reproducing said wide-band signal from said received first and further narrow-band signals.

From another aspect thereof, the subject invention resides in apparatus for transferring a wide-band signal via a plurality of separate data channels, comprising, in combination, means for partitioning a wide-band signal into a low-frequency component and a high-frequency component at least partially above said low-frequency component in the spectrum of said wide-band signal, means connected to said partitioning means for translating said low-frequency component into a first narrow-band signal, means connected to said partitioning means for distributing sequential pluralities of elements of said high-frequency component over (n−1) groups, with n being equal to the number of said plurality of separate narrow-band signals, means connected to said distributing means for separately storing each plurality of elements in each group, means connected to said storing means for providing separate further narrow-band signals in addition to said first narrow-band signal by releasing stored pluralities of elements from said groups in an at least partially time-coincident relationship, means connected to said translating means for placing said first narrow-band signal into an at least partially time-coincident relationship with said further narrow-band signals, means connected to said translating means and said further narrow-band signal providing means for transferring said at least partially time-coincident first and further narrow-band signals through said separate data channels, means connected to said data channels for receiving said transferred first and further narrow-band signals from said data channels, and means connected to said receiving means for reproducing said wide-band signal from said received first and further narrow-band signals.

From another aspect thereof, the subject invention resides in apparatus for transferring a wide-band signal via a plurality of separate data channels, comprising, in combination, means for partitioning the wide-band signal into a low-frequency component and a high-frequency component at least partially above said low-frequency component in the spectrum of said wide-band signal, means connected to said partitioning means for translating said low-frequency component into an alternating current signal having a band of frequencies at least partially higher than the frequencies of said low-frequency component and narrower than the spectrum of said wide-band signal, means connected to said translating means for storing sequential pluralities of elements of said alternating-current signal, means connected to said storing means for releasing said stored sequential pluralities of elements of said alternating-current signal to provide a first narrow-band signal, means connected to said partitioning means for distributing sequential pluralities of elements of said high-frequency component over (n−1) groups, with n being equal to the number of said plurality of separate narrow-band signals, means connected to said distributing means for separately storing each plurality of elements in each group, means connected to the latter storing means for providing separate further narrow-band signals in addition to said first narrow-band signal by releasing stored pluralities of elements from said groups in an at least partially time-coincident relationship, means connected to said first narrow-band signal providing means and said further narrow-band signal providing means for transferring said first and further narrow-band signals through said separate data channels, means connected to said data channels for receiving said transferred first and further narrow-band signals from said data channels, and means connected to said receiving means for reproducing said wide-band signal from said received first and further narrow-band signals.

From another aspect thereof, the subject invention resides in apparatus for transferring a wide-band signal via a plurality of separate data channels, comprising, in combination, means for partitioning the wide-band signal into a low-frequency component and a high-frequency component at least partially above said low-frequency component in the spectrum of said wide-band signal, means connected to said partitioning means for storing sequential pluralities of elements of said low-frequency component, means connected to said storing means for releasing said stored sequential pluralities of elements of said low-frequency component, means connected to said storing means for translating said released sequential pluralities of elements of said low-frequency component into a first narrow-band signal having a band of frequencies at least partially higher than the frequencies of said low-frequency component, means connected to said partitioning means for distributing sequential pluralities of elements of said high-frequency component over (n−1) groups, with n being equal to the number of said plurality of separate narrow-band signals, means connected to said distributing means for separately storing each plurality of elements in each group, means connected to the latter storing means for providing separate further narrow-band signals in addition to said first narrow-band signal by releasing stored pluralities of elements from said groups in an at least partially time-coincident relationship, means connected to said translating means and said further narrow-band signal providing means for transferring said first and further narrow-band signals through said separate data channels, means connected to said data channels for receiving said transferred first and further narrow-band signals from said data channels, and means connected to said receiving means for reproducing said wide-band signal from said received first and further narrow-band signals.

From another aspect thereof, the subject invention resides in apparatus for transferring a wide-band signal via a plurality of separate data channels, comprising, in combination, means for partitioning the wide-band signal into a low-frequency component and a high-frequency component at least partially above said low-frequency component in the spectrum of said wide-band signal, means connected to said translating means for translating said low-frequency component into a first narrow-band signal having a band of frequencies at least partially higher than the frequencies of said low-frequency component, means connected to said partitioning means for partitioning said high-frequency component into at least two separate further narrow-band signals each having a bandwidth smaller than the bandwidth of said high-frequency component, means for transferring said first and further narrow-band signals through said separate data channels, means connected to said data channels for receiving said transferred first and further narrow-band signals from said data channels, and means connected to said receiving means for reproducing said wide-band signal from said received first and further narrow-band signals.

From another aspect thereof, the subject invention resides in apparatus for transferring a wide-band signal via a plurality of separate narrow-band signals, comprising, in combination, means for distributing sequential pluralities of elements of said wide-band signal over a plurality of groups in a distribution operation, means connected to, but distinct from, said distributing means for separately storing each plurality of elements in each group in a storage operation distinct from said distribution operation, means connected to said storing means for providing separate narrow-band signals by releasing stored pluralities of elements from said groups in an at least partially time-coincident relationship, means connected to said narrow-band signal providing means for transferring said separate narrow-band signals through said separate data channels, means connected to said data channels for receiving said transferred narrow-band signals from said data channels, and means connected to said receiving means for reproducing said wide-band signal from said received narrow-band signals.

From another aspect thereof, the subject invention resides in apparatus for reproducing a wide-band signal from a plurality of separate narrow-band signals obtained by partitioning a wide-band signal into a low-frequency component and a high-frequency component at least partially above said low-frequency component in the spectrum of said wide-band signal, translating said low-frequency component into a first narrow-band signal having a band of frequencies at least partially higher than the frequencies of aid low-frequency component, distributing sequential pluralities of elements of said high-frequency component over (n−1) groups with n being equal to the number of said plurality of separate narrow-band signals, separately storing each plurality of elements in each group, and providing separate narrow-band signals in addition to said first narrow-band signal by releasing stored pluralities of elements from said groups in an at least partially time-coincident relationship, with said first and further narrow-band signals having been transferred through data channels.

The apparatus according to the latter aspect of the subject invention comprises, in combination, means for receiving said transferred first and further narrow-band signals from said data channels, means connected to said received means for retranslating said received first narrow-band signal into a resulting low-frequency component, means connected to said received means for separately storing pluralities of elements of said received further narrow-band signals, means connected to said storing means for releasing and combining stored pluralities of elements of said received further narrow-band signals to restore said high-frequency component, and means connected to said retranslating means and releasing means for restoring said wide-band signal by combining said restored high-frequency component with said resulting low-frequency component.

From another aspect thereof, the subject invention resides in apparatus for reproducing a wide-band signal from a plurality of separate narrow-band signals, obtained by partitioning a wide-band signal into a low-frequency component and a high-frequency component at least partially above said low-frequency component in the spectrum of said wide-band signal, translating said low-frequency component into an alternating-current signal having a band of frequencies at least partially higher than the frequencies of said low-frequency component and narrower than the spectrum of said wide-band signal, storing sequential pluralities of elements of said alternating-current signal, releasing said stored sequential pluralities of elements of said alternating-current signal to provide a first narrow-band signal, distributing sequential pluralities of elements of said high-frequency component over (n−1) groups, with n being equal to the number of said plurality of separate narrow-band signals, separately storing each plurality of elements in each group, and providing separate further narrow-band signals in addition to said first narrow-band signal by releasing stored pluralities of elements from said groups in an at least partially time-coincident relationship, with said first and further narrow-band signals having been transferred through data channels.

The apparatus according to the latter aspect of the subject invention comprises, in combination, means for receiving said transferred first and further narrow-band signals, means connected to said receiving means for separately storing pluralities of elements of said received first and further narrow-band signals, means connected to said storing means for separately releasing said stored pluralities of elements of said received first and further narrow-band signals, means connected to one of said releasing means and storing means for translating released pluralities of elements of the received first narrow-band signal into a resulting low-frequency component, means connected to one of said releasing means and storing means for combining released pluralities of elements of the received further narrow-band signals to restore said high-frequency component, and means connected to said translating means and combining means for restoring said wide-band signal by combining said restored high-frequency component with said resulting low-frequency component.

From another aspect thereof, the subject invention resides in apparatus for reproducing a wide-band signal from a plurality of separate narrow-band signals, obtained by partitioning a wide-band signal into a low-frequency component and a high-frequency component at least partially above said low-frequency component in the spectrum of said wide-band signal, storing sequential pluralities of elements of said low-frequency component, releasing said stored sequential pluralities of elements of said low-frequency component, translating said released sequential pluralities of elements of said low-frequency component into a first narrow-band signal having a band of frequencies at least partially higher than the frequencies of said low-frequency component, distributing sequential pluralities of elements of said high-frequency component over (n−1) groups, with n being equal to the number of said plurality of separate narrow-band signals, separately storing each plurality of elements in each group, and providing separate further narrow-band signals in addition to said first narrow-band signal by releasing stored pluralities of elements from said groups in an at least partially time-coincident relationship, with said first and further narrow-band signals having been transferred through data channels.

The apparatus according to the latter aspect of the subject invention comprises, in combination, means for receiving said transferred first and further narrow-band signals, means connected to said receiving means for retranslating said received first narrow-band signal into a low-frequency component, means connected to said retranslating means for separately storing pluralities of elements of said low-frequency component and of said received further narrow-band signals, means connected to said storing means for separately releasing pluralities of elements of said stored low-frequency component and further narrow-band signals in an at least partially time-coincident relationship, means connected to one of said releasing means and storing means for combining released pluralities of elements of the received further narrow-band signals to restore said high-frequency component, and means connected to one of said releasing means and storing means and to said combining means for restoring said wide-band signal by combining said restored high-frequency component with said released low-frequency component.

From another aspect thereof, the subject invention resides in apparatus for reproducing a wide-band signal from a plurality of separate narrow-band signals obtained by partitioning a wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, and partitioning said high-frequency component into at least two separate further narrow-band signals each having a bandwidth smaller than the bandwidth of said high-frequency component, with said first and further narrow-band signals having been transferred through data channels.

The apparatus according to the latter aspect of the subject invention comprises, in combination, means for receiving said transferred first and further narrow-band signals from said data channels, means connected to said receiving means for retranslating said received first narrow-band signal into a resulting low-frequency component, means connected to said receiving means for recombining said received further narrow-band signals into a high-frequency component, and means connected to said retranslation means and recombining means for combining said resulting low-frequency component and recombined high-frequency component into a wide-band signal.

From another aspect thereof, the subject invention resides in apparatus of reproducing a wide-band signal from a plurality of separate narrow-band signals obtained by distributing sequential pluralities of elements of said wide-band signal over a plurality of groups, separately storing each plurality of elements in each group, and releasing stored pluralities of elements from said groups in an at least partially time-concident relationship to provide said separate narrow-band signals, with said separate narrow-band signals having been transferred through data channels.

The apparatus according to the latter aspect of the subject invention comprises, in combination, means for receiving said transferred separate narrow-band signals, means connected to said receiving means for separately storing pluralities of elements of said received narrow-band signals, and means connected to said storing means for releasing and combining stored pluralities of elements of said received narrow-band signals to restore said wide-band signal.

BRIEF DESCRIPTION OF THE DRAWINGS

The invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is a block diagram of a bandsplitter apparatus in accordance with a preferred embodiment of the subject invention;

FIG. 2 is a block diagram of a modification of the apparatus of FIG. 1;

Figure 3:
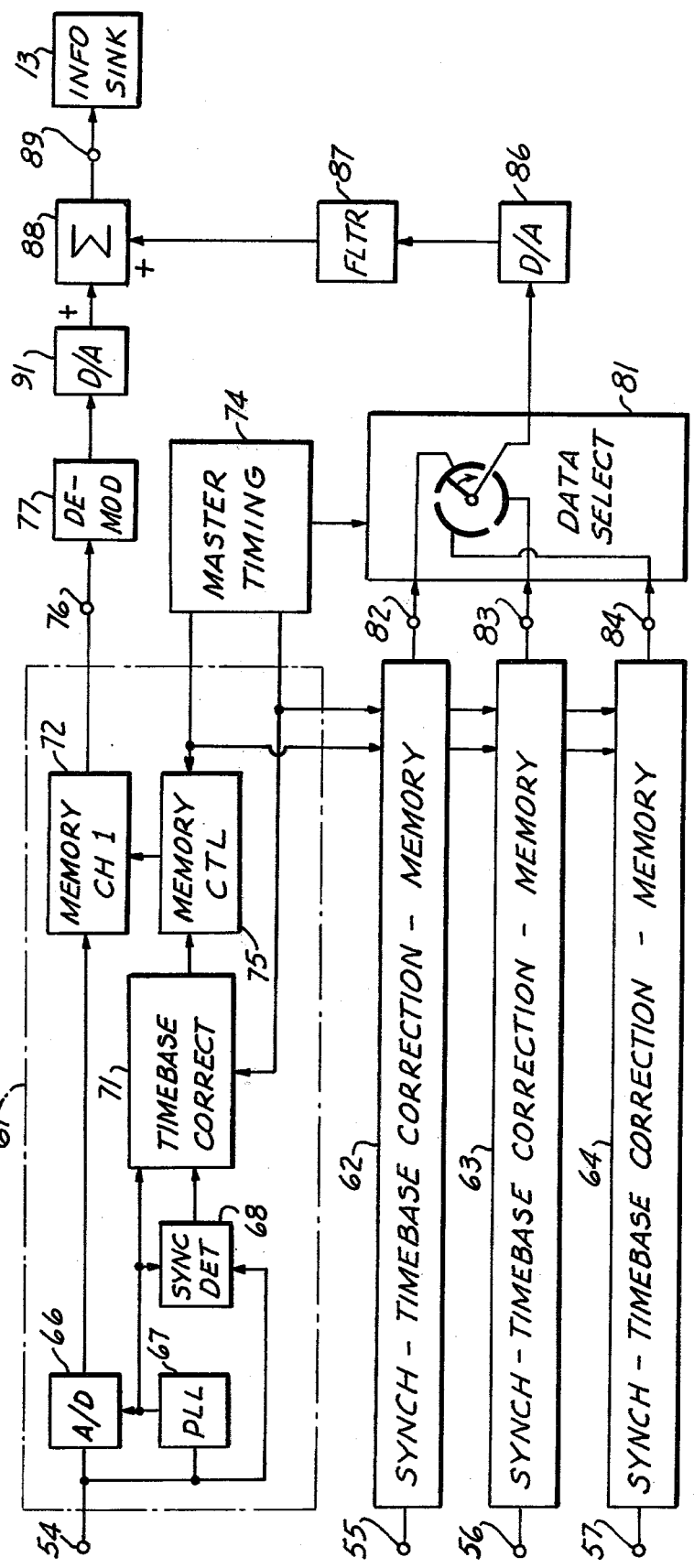
FIG. 3 is a block diagram of a band-joiner apparatus in accordance with a preferred embodiment of the subject invention.
Figure 4:
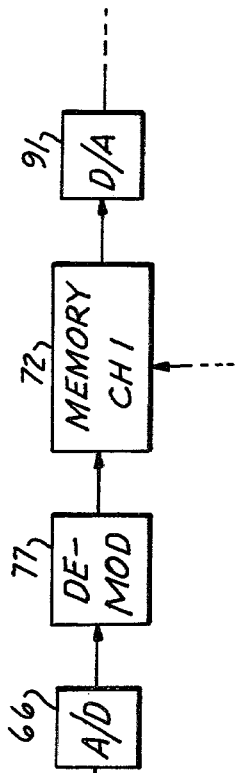
FIG. 4 is a block diagram of a modification of the apparatus of FIG. 3.

More generally speaking, FIGS. 1 and 3 jointly, with or without modifications according to FIGS. 2 and 4, represent a block diagram of what may be termed a bandsplitter type signal transfer system.

DESCRIPTION OF PREFERRED EMBODIMENTS

In terms of general statement applicable to information transfer systems, the bandsplitter-type signal transfer system according to FIGS. 1 and 3 comprises an information source 12, an information sink 13, information transfer channel means 14, and an encoder 15 and decoder 16 which match the source and the sink, respectively, to the transfer channel means. In the case of bandsplitter-type information or signal transfer or communication systems, the encoder 15 is a band-splitter which partitions a wide-band signal from the information source 12 into a plurality of separate narrow-band signals for transfer through a like plurality of data channels in the information transfer channel means 14.

Similarly, the encoder 16 is, in effect, a band-joiner which recombines the separately transferred narrow-band signals typically into an adequate likeness of the initial wide-band signal for application to the information sink.

By way of example, the information source 12 may be a video signal source comprising, for instance, a video camera, an off-the-air, cable or closed-circuit television receiver, video tape recorder, video disk playback machine, or other source of pictorial or pictorially presented information. Typically, such an information source also includes or has associated therewith a source of synchronization information (included in block 12), for synchronizing the video information provided by the source. For instance, the source of synchronization information may provide a sync signal for arranging the generated video information in image fields, with our without field interlace, in accordance with conventional practice. Also by way of example, the information sink 13 may include a video monitor or television display set. Typically, equipment for generating, transferring and reproducing audio information would also be included in such a video information transfer system.

Of course, the subject invention is not limited in its application or utility to video systems, since the band-splitting and band-joining principles, methods and apparatus o the subject invention are applicable to a large variety of wide-band information and signals.

The wide-band signal from the source 12 is applied via an input terminal 18 of the bandsplitter 15 to a low-pass filter 19 and a delay element 20 which corresponds to the low-pass filter in terms of the time delay it imposes on signals proceeding therethrough. The low-pass filter 19 extracts from the wide-band signal a low-frequency component which it applies to a line 21 and also to an inverting input 22 of a summing circuit 23.

The delay element 20, on the other hand, imposes on the incoming wide-band signal a delay corresponding to the delay imposed by the low-pass filter 19 on the low-frequency component. In particular, the delay element 20 applies the delayed wide-band signal to a non-inverting input of the summing circuit 23.

Reference may, in this respect, be had to the above mentioned U.S. Pat. No. 2,760,011, by C. E. Berry, disclosing several forms of summing circuits, including a subtraction circuit, a combination of phase inverter and summing circuit, and a differential amplifier embodiment which may be employed at 23 of FIG. 1, if desired. Reference may, in this respect, also be had to the above mentioned U.S. Pat. No. 3,061,684, by J. H. Lancor and C. E. Berry.

As a result of their cooperation, the low-pass filter 19, delay element 20 and inverting/non-inverting input summing circuit 23 partition the wide-band signal into a low-frequency component appearing in the lead 21 and a high-frequency component appearing in a lead 26. The terms "low-frequency component" and "high-frequency component" again are relative terms in that the high-frequency component is at least partially above the low-frequency component in the spectrum of the wide-band signal. For instance, the low-frequency component in the lead 21 may extend from direct-current to a frequency approximately equal to the bandwidth of the wide-band signal divided by the number of channels at 14. However, this is not a strict limitation and the upper region of the low-frequency component may to some extent overlap the lower region of the high-frequency component in terms of frequency spectrum.

A branch 28 is connected to the lead 21 for translating the low-frequency component into a first narrow-band signal having a band of frequencies at least partially higher than the frequencies of the low-frequency component. Accordingly, since the low-frequency component provided by the low-pass filter 19 includes a direct-current component, the narrow-band signal as provided by the branch 28 is free of any direct-current component. In consequence, the provided first narrow-band signal is recordable in a recording/playback channel or is otherwise transferrable by a process which could not handle direct-current components.

The above mentioned problem pertaining to an occurrence of holes with gradual slopes in the frequency spectrum of the recorded or otherwise transferred signals is thus solved with the aid of the branch 28 as far as direct-current inputs are concerned.

In accordance with a preferred embodiment illustrated in FIG. 1, the low-frequency component is translated into the first narrow-band signal by modulation on a carrier in a modulator 29. By way of example, the modulator 29 may be an amplitude modulator, preferably a double-sideband modulator for amplitude-modulating a carrier with the low-frequency component. Alternatively, a frequency modulator may be employed at 29 for frequency-modulating a carrier with the low-frequency component.

By way of example, the carrier used in the modulator 29 may be of the order of about 130 kHz. The bandwidth of the low-frequency signal at 21 may be from direct-current to 30 kHz. In the case of a double-sideband modulator, this requires the first channel, CH 1, to have a bandwidth of from about 100 kHz to about 160 kHz. In this example, the first narrow-band signal thus has a band of frequencies considerably higher than the frequency of the low-frequency component which meets the above mentioned requirement that the first narrow-band signal has a bandwidth at least partially higher than the frequencies of the low-frequency component.

At least one of the remaining components of the branch 28 is best understood in the context of the provision of the additional narrow-band signals. Accordingly, the processing of the high-frequency component will now be considered ahead of the remaining constituents of the branch 28.

In particular, the high-frequency component occurring in the lead 26 is sampled by a demultiplexer or sampler 31. Graphically, the demultiplexer 31 is represented as a rotary switch having (n−1) elongate segments; wherein n is equal to the number of the plurality of separate narrow-band signals into which the wide-band signal occurring at the input 18 is partitioned. In the illustrated preferred embodiment, the factor n is equal to the number of channels at 14.

The important point here is that the demultiplexer 31 distributes sequential pluralities of elements of the high-frequency component over (n−1) groups, rather than distributing such elements individually among the groups.

The elements in the pluralities of elements of the high-frequency component may be incremental parts of that component. By way of example, FIG. 1 shows that the high-frequency component proceeding via lead 26 is subjected to an analog-to-digital conversion by an analog-to-digital converter 32 and the distribution of sequential pluralities of elements the high-frequency component is effected after that analog-to-digital conversion.

Consequently, the demultiplexer 31 distributes sequential pluralities of binary elements or bits of the high-frequency component over (n−1) groups represented, for instance, by leads 32, 33 and 34.

Each plurality of elements in each group is separately stored in (n−1) memories 35, 36 and 37, respectively.

The low-frequency component branch 28 has a memory 38 corresponding to the memories 35 to 37 and serving primarily the purpose of placing the first narrow-band signal into an at least partially time-coincident relationship with the further narrow-band signals provided in the (n−1) groups.

What is presently believed to be the best mode of carrying the subject invention into effect employs digital memories 35 to 38 and, accordingly, has in the low-frequency component branch 28 an analog-to-digital converter 39 corresponding to the analog-to-digital converter 32 in the high-frequency component section.

It is thus seen from FIG. 1 that the low-frequency component is subjected to an analog-to-digital conversion and is translated by the modulator 29 into the first narrow-band signal after the analog-to-digital conversion. In particular, the digital low-frequency component is translated by the modulator 29 into a digital first narrow-band signal having an at least partially higher band of frequencies than the frequencies of the low-frequency component.

The digital first narrow-band signal in the branch 28 is thereupon subjected to a digital-to-analog conversion in a digital-to-analog converter 39.

The bandsplitter 15 includes a master oscillator and timing unit 41 which drives or times the demultiplexer 31 and the memories 35 to 38. The unit 41 may be of a conventional type as used for clocking samplers or demultiplexers and memories.

In accordance with what is presently considered the best mode of carrying the subject invention into effect, the storage operation carried out by the memories 35 to 38 is distinct from the distribution operation effected by the demultiplexer 31. In other words, the storing means 35 to 38 are distinct from the distributing means 31. With respect to the memories 35 to 37 it may, therefore, be said that each plurality of elements of the high-frequency component in each group is stored separately in a storage operation distinct from the distribution of sequential pluralities of elements by the demultiplexer 31. Similarly, the storage operation effected by the memory 38 in the low-frequency component branch 38 is distinct from the partitioning function of the low-pass filter 19 and elements 20 and 23.

The bandsplitter 15 of FIG. 1 provides separate narrow-band signals in addition to the first narrow-band signal by releasing stored pluralities of component elements from the groups or memory elements 35 to 37 in an at least partially time-coincident relationship. Typically, the master oscillator and timing unit 41 releases stored pluralities of elements from the memories 35 to 37 at a lower rate than the rate at which such elements have been stored in these memories, thereby realizing a bandwidth reduction.

In the illustrated preferred embodiment, the stored pluralities of elements are released from the groups or memories 35 to 37 in digital form and are subjected to a digital-to-analog conversion by a number of digital-to-analog converters 42, 43 and 44 individually connected to the outputs of the memory elements 35, 36 and 37, respectively.

In principle, it would be within the broad scope of the subject invention to record or otherwise transfer the first and further narrow-band signals in or through the data channel means 14 in a digital form. In that case, the digital-to-analog conversion would take place on the decoder or band-joiner side if analog signals are desired or necessary. However, the digital-to-analog conversion effected by the elements 39, 42, 43 and 44 ahead of the data channel means 14 is presently preferred since a recording or other transfer of digital signals would typically require a much higher bandwidth than a recording or other transfer of analog signals.

Similarly, the analog-to-digital conversion and subsequent digital-to-analog conversion effected according to FIG. 1 is not absolutely necessary within the broad contemplation of the subject invention. However, the presently preferred analog-to-digital and subsequent digital-to-analog conversion has proved itself superior in terms of performance and availability of suitable components, in particular the memory elements and their driving equipment.

The output signals of the digital-to-analog converters 39, 42, 43 and 44; that is, the analog version of the first narrow-band signal and of the additional or further narrow-band signals, are applied to one input of a set of summing elements 46, 47, 48 and 49 corresponding in number to the number of channels (n) at 14. The purpose of the summing elements 46 to 49 is to permit the narrow-band signals to be provided with information for restoring the wide-band signal from these narrow band signals on the decoder or band-joiner side.

To this end, the master oscillator and timing unit 41 clocks the output function of the memory elements 35 to 38 at a rate somewhat higher than the rate that would yield the highest bandwidth reduction. For instance, if the timing unit 41 clocks the memories 37 to 38 at a given input rate, then this timing unit would clock these memory elements at an output rate which is slightly higher than the input rate divided by the number (n) of data channels at 14.

In this manner, the timing unit 41 causes time gaps to occur in the output signals of the memory elements 35 to 38 between released pluralities of signal component elements. Corresponding gaps appear, therefore, in each of the separate narrow-band signals, including the first narrow-band signal applied to the summing element 46 and the separate further narrow-band signals applied to the summing elements 47, 48 and 49, respectively.

The summing elements 46 to 49 cooperate with a sync code and pilot signal generator 51 in inserting into the time gaps of the separate narrow-band signals information for restoring the wide-band signal from these narrow-band signals after recording/playback, transmission or other transfer of the narrow-band signals. Synchronization coding and pilot signal techniques and apparatus for restoring reproduced or transmitted video information have been widely used and are well known as such in the video art.

The supplemented narrow-band signals proceeding from the outputs of the summing elements 46 to 49 are applied to the separate channels CH 1 to CH 4 of the channel means 14.

Of course, the separate narrow-band signals could be multiplexed or otherwise combined for recording or transmission. However, the bandwidth reduction benefits of the subject bandsplitting system are typically best realized if recording or transmission takes place in separate channels.

For instance, the component 14 may comprise a recorder, such as a magnetic tape recorder, in which the narrow-band signals are recorded in separate recording channels, such as separate tracks of a magnetic recording tape. In this respect, the term "transfer" as herein employed is intended to be broad enough to refer not only to such processes as data transmission and data recording/playback, but also to a data recording step as such, wherein the narrow-band signals are transferred from the form of electrical signals into a form of corresponding magnetized patterns in a magnetic recording tape or other magnetic recording medium, to name but one kind of possible recording technique.

Several advantages of the subject invention and its operation may be noted at this juncture by way of comparison to multi-channel bandsplitter systems which do not employ the signal component distribution operation and signal component element storage and release-from-storage function of the subject invention.

In this respect, it is generally known that a frequency-variable gain inequality among different channels in a multi-channel system will in practice occur regardless of the care exercised in balancing the gains of the individual channels.

In a bandsplitter/band-joiner system, such inevitable gain variations manifest themselves in ripple in the amplitude spectrum of the recombined wide-band signal. This amplitude modulation produces sidebands around the recorded or otherwise transferred input frequencies. These sidebands, even when relatively small, have a degrading effect on the system noise power ratio and also on the recorded or otherwise transferred information.

Against this background, consider the fact that prior-art time division multiplexing systems switch from channel to channel at a relatively high frequency, when they apply each increment or element of the wide-band signal to another channel than the next-preceding increment or element in their sampling systems.

By radical contrast, and as symbolized by the elongate segments in the demultiplexer 31 shown in FIG. 1, the subject invention, by distributing and storing sequential pluralities of elements (as distinguished from individual elements) of the wide-band signal or high-frequency component over the different channels or, in accordance with a preferred embodiment, over (n−1) groups, substantially decreases the frequency at which an amplitude modulation associated with channel-to-channel gain variation will occur in the combined output spectrum.

In this respect, and depending on the particular application, dozens, hundreds or thousands of adjacent elements of the wide-band signal or its high-frequency component may be applied and stored in the same memory element 35, etc, before a subsequent plurality of elements is applied to the next memory element in the sampling or distribution sequence.

Without any intent of limiting the broad scope of the subject invention, an example of an aspect of its operation will now be given as follows:

The demultiplexer 31, driven by the master oscillator and timing unit 41, takes the digitized high-frequency component of the wide-band signal from the analog-to-digital converter 32 and applies, say, the first successive 3000 samples (with 8 bits each)=24,000 elements of the digitized high-frequency component to the memory 35. The master oscillator and timing unit 41 clocks these 3000×8 immediately adjacent elements into the memory 35 at a sufficiently high rate to avoid any loss of information between adjacent distribution steps. The memory 35 stores these 3000 clocked-in samples.

The demultiplexer 31 thereupon applies the next 3000×8 elements of the digitized high-frequency component to the memory 36 for clocking in by the unit 41 and storage in the memory 36. Immediately thereafter, the demultiplexer or sampler 31 applies the yet further 3000 samples of the digitized high-frequency component to the memory 37 for clocking in by the unit 41 and storage in that memory 37. The subsequent 3000 samples of the digitized high-frequency component are thereupon applied by the demultiplexer 31 to the first memory 35 for storage therein.

This process of in effect rotating sequential pluralities of elements (such as 3000 samples) of the high-frequency component over the memories 35 to 37 continues, whereby the high-frequency component of the wide-band signal is partitioned among, or distributed over the channels CH 2 to CH 4 upon being clocked out of the memory elements 35 to 37 and provided, if desired, with information for restoring the wide-band signal as described above.

In our example, wherein 3000 signal component samples are stored in the same memory element at a time, the switching of signal component elements between channels is reduced by a factor approaching 3000, as compared to the above mentioned prior-art time division multiplexing bandsplitter technique wherein each sample is individually applied to a different channel without storage. Thus the prior-art ripple or amplitude modulation due to channel-to-channel gain inequalities is prevented from assuming any significance in the operation of the system according to the preferred embodiment shown in FIG. 1.

The illustrated preferred embodiment of the subject invention also solves a further problem of prior-art systems. In particular, it is known that timebase errors between channels in a multi-channel recording or transmission system tend to be much more severe in practice than the timebase error within one and the same channel. Again, if the prior-art technique of applying each adjacent pair of successive samples of the wide-band signal is utilized, each sampling period is exposed to the worst case of timebase error that can occur in a bandsplitter.

By way of favorable contrast, the illustrated preferred embodiment of the subject invention by reducing the frequency of requisite channel-to-channel switching by a factor of, say, 3000 as mentioned above, exposes each sampling period relatively infrequently to the channel-to-channel timebase error, as compared to the less severe intrachannel timebase error. In short potential timebase errors between adjacent output samples are greatly reduced by the operation of the subject invention.

In practice, the expression "element" in the phrase "pluralities of elements" may mean a bit, a byte, a word, a sample or another increment, unit or portion of the particular component or signal, provided that each plurality of elements is always distributed and stored as that plurality, rather than being broken down among two or more groups or channels.

Another problem of prior-art bandsplitter systems has resided in the difficulty of providing and utilizing pilot signals and similar information that could be reliably used in the reconstruction of the wide-band signal. This was aggravated by the fact that prior-art systems really required two pilots, one being located above the band of the information signal, and the other being located below that band in order to resolve ambiguities created by the magnitude of the timebase error which generally eluded resolution by the upper pilot.

Since the use of the memory elements 35 to 38 and their operation as shown in FIG. 1 and described above very conveniently permit the stocking of the narrow-band signals with information aiding in the restoration of the wide-band signal, also as disclosed above, the latter prior-art problem is conveniently and reliably solved by the subject invention.

Moreover, by relegating the preservation of information concerning a direct-current component in the wide-band signal to the one branch 28, and by using memory elements as described above in the other branches at 35 to 37, the direct-current content is eliminated in all groups or channels except in the branch 28. Accordingly, the number of requisite filters can be reduced to the one low-pass filter 19, and the number of requisite modulators can also be reduced to the one modulator 29 for the entire system.

As indicated above, the memory element 38 in the branch 28 serves to place the first narrow-band signal into an at least partially time-coincident relationship with the further narrow-band signals in the channels CH 2 to CH 4.

To this end, the memory element 38 stores either the low-frequency component or the first narrow-band signal and, under the control of the master oscillator and timing unit 41, thereupon releases that one of the low-frequency component and first narrow-band signal.

In particular, the memory 38 in FIG. 1 stores sequential pluralities of elements of the digitized first narrow-band signal provided by the modulator 29 and thereupon releases such stored elements to the digital-to-analog converter 39 in an at least partially time-coincident relationship with the other narrow-band signals.

Alternatively, and as shown in FIG. 2, the memory element 38 stores successive elements of the digitized low-frequency component and, again under the control of the master oscillator and timing unit 41, releases such stored elements to the modulator 29 for generation of the first narrow-band signal by modulation on a carrier. According to FIG. 2, the modulation of the output of the memory element 38 takes place prior to the digital-to-analog conversion at 39. However, it is, of course, within the scope of the subject invention that the requisite modulation may take place after the analog-to-digital conversion of the output of the memory 38.

Comparing FIGS. 1 and 2, it is thus seen that the modulator 29 in the system of FIG. 1 translates the low-frequency component, derived at 21 and digitized at 39, into an alternating-current signal having a band of frequencies at least partially higher than the frequencies of the low-frequency component and narrower than the spectrum of the wide-band signal.

Sequential pluralities of elements of that alternating-current signal are then stored in the memory 38 and are released to provide a digitized first narrow-band signal which is converted to its analog version at 39.

On the other hand, the memory 38 in the modification of FIG. 2 stores sequential pluralities of elements of the low-frequency component after tha analog-to-digital conversion at 39. Under the control of the unit 41, the memory 38 in FIG. 2 then releases the stored sequential pluralities of elements of the digitized low-frequency component to the modulator 29 for translation into a first narrow-band signal having a band of frequencies at least partially higher than the frequencies of the low-frequency component. The modulator 29, in turn, releases in the modification shown in FIG. 2 the first narrow-band signal to the digital-to-analog converter 39 for provision of the analog version of the first narrow-band signal.

In either case, the resulting first narrow-band signal provided in the firsrt branch 28 in the system of FIG. 1, or in the modified branch 28' according to FIG. 2, and the further separate narrow-band signals produced with the aid of the memory elements 35 to 37, are applied to the individual channels CH 1 to CH 4 of the recorder or data link for recording and subsequent playback or for transmission. In this respect, the component 14 may simply be a recorder, and a playback machine may be located separately and remotely from the recorder. This may, for instance, be the case when magnetic tapes are prerecorded prior to distribution or sale or when other types of records are made for subsequent distribution, sale and playback at different locations.

On the other hand, and as shown in FIG. 1, the component 14 may have both recording and playback facilities, whereby the narrow-band signals played back from the recording channels CH 1 to CH 4 appear separately at terminals 54 and 57 shown in FIGS. 1 and 3.

By way of further example, the block 14 may signify transmission channels whereby transmitted narrow-band signals appear at the mentioned terminals 54 to 57.

The band-joiner apparatus shown in FIG. 3 receives the transferred first and further narrow-band signals from the data channels CH 1 to CH 4 via terminals 54 to 57 and reproduces the initial wide-band signal from such received first and further narrow-band signals. In this respect, the phrase "reproducing the wide-band signal" and similar expressions do not necessarily indicate that the wide-band input signal is reproduced in every detail. Indeed, a less than perfect reproduction or reconstruction of the wide-band signal may be appropriate in many instances where such factors as bandwidth reduction and hardware simplification takes precedence over an absolutely perfect picture or information quality.

The decoder or band-joiner 16 of FIG. 3 has essentially identical units 61, 62, 63 and 64, one for each narrow-band channel. Only the unit 61 is illustrated in detail in FIG. 3.

In particular, the narrow-band signal proceeding via terminal 54 is applied to an analog-to-digital converter 66, a phase-locked loop 67 and a sync detector 68. The phase-locked loop 67 tracks the pilot tone or signal provided in the sync code and pilot signal generator 51 and inserted into time gaps in the narrow-band signals as disclosed above.

The sync detector 68 detects the sync code also provided by the generator 51 shown in FIG. 1.

The output signal of the phase-locked loop 67 controls the analog-to-digital converter 66 and a timebase correction logic 71. The analog-to-digital converter 66 converts the played-back or transferred narrow-band signal received via terminal 54 to a digital narrow-band signal which is applied to a memory element 72 that corresponds to the memory element 38 shown in FIG. 1. The memory element 72 stores successive elements or bits of the digitized received first narrow-band signal.

In particular, the phase-locked loop 67, the sync detector 68 and a master timing unit 74, which corresponds to the unit 41 of FIG. 1, control the timebase correction logic 71 which, in turn, controls, or may be integral with, a memory control 75 which operates the input and output functions of the memory 72.

In practice, the sync code or word preferably is clocked synchronously with the pilot tone, such as at a rate of one bit cell per pilot tone cycle. The recovered pilot tone may then act as a bit synchronizer of the sync detection circuitry.

The signal clocked out of memory 72 by the memory control 75 is applied via a terminal 76 to aa demodulator 77 which corresponds to the modulator 29 of FIG. 1. The demodulator 77 translates pluralities of bits or elements of the digitized received first narrow-band signals as released by the memory 72 into a resulting low-frequency component that typically corresponds to the low-frequency component extracted by the low-pass filter 19 from the wide-band signal.

Synchronization, timebase correction and memory units 62, 63 and 64 have an analog-to-digital converter, a phase-locked loop, a sync detector, a timebase correction logic, a memory element and a memory control structurally corresponding to, and interconnected in the manner shown for the analog-to-digital converter 66, phase-locked loop 67, sync detector 68, timebase correction logic 71, memory element 72 and memory control 75 in the synchronization, timebase correction and memory unit 61. Also, the timebase correction logics of the units 62, 63 and 64, like the timebase correction logic of the unit 61 synchronize the master timing unit 74 which, in turn, clocks the memory elements 72 etc. of the units 61 to 64 via their memory controls 75 etc.

Functionally, the memory elements of the units 62 to 64 individually correspond to the memory elements 35 to 37 of the bandsplitter 16 shown in FIG. 1.

Considering the synchronization, timebase correction and memory units 61 to 64 of the decoder or band-joiner 16 of FIG. 3, it will be recognized that the broadly conceived term "receiving" as to the played-back, transmitted or otherwise transferred first and further narrow-band signals includes the concept of timebase correction. Such correction may, as shown within the block 61 of FIG. 3, be effected with the aid of the memory elements 72 etc. which, in each of the units 61 to 64 separately store pluralities of bits or elements of the received first and further narrow-band signals, respectively.

The master timing unit 74 and a multiplexer or data selector 81 cooperate in releasing and combining stored pluralities of elements of the received further narrow-band signals to restore the high-frequency component.

In particular, the master timing unit 74, aided by the timebase correction logic and memory control of each unit 62 and 64, releases stored pluralities of bits or elements of the received further narrow-band signals via terminals 62 to 64 to the data selector 81 which, clocked by the master timing unit 74, combines such released pluralities of bits or elements to restore a digital version of the high-frequency component.

The data selector 81 corresponds to the demultiplexer 31 shown in FIG. 3, and the restored digital high-frequency component supplied by the data selector 81 to a digital-to-analog converter 86 corresponds to the digital high-frequency component supplied by the analog-to-digital converter 32 to the demultiplexer 31 in the bandsplitter 15 of FIG. 1.

The digital-to-analog converter 86 converts the output of the data selector 81 to an analog version of the high-frequency component of the wide-band signal to be restored. Undesired components are eliminated by a filter 87, and a summing circuit 88 restores the wide-band signal at an output terminal 89 by combining the filtered restored high-frequency component with the resulting low-frequency component supplied by a digital-to-analog converter 91.

As seen in FIG. 3, the synchronization, timebase correction and memory units 62 to 64 or means for separately storing pluralities of elements of the received further narrow-band signals are distinct from the data selector 81 or means for combining stored pluralities of elements of the received further narrow-band signals.

Accordingly, it may be said with reference to the data selector 81 that the stored pluralities of elements of the received further narrow-band signals are combined to the high-frequency component in a signal combining operation and, with reference to the memory elements in the units 62 to 64, that the pluralities of elements of the received further narrow-band signals are separately stored in aa storage operation distinct from the signal combining operation of the data selector 81.

Also, it may be said that the provision of the resulting low-frequency component and the restoration of the high-frequency component are controlled with the restoring information which, as explained in connection with FIG. 1, is inserted in time gaps of each narrow-band signal prior to its transfer through the data channels at 14. Though the apparatus of FIG. 3 reproduces the wide-band signal from the received first and further narrow-band signals with the aid of restoring information received via time gaps in the transferred narrow-band signal, it is not necessary that such restoring information control every aspect of the reproduction of the wide-band signal. Thus, as seen with respect to FIGS. 1 and 3, the sync code and pilot signal control at least part of the restoration of the wide-band signal, namely the timebase correction of the transferred narrow-band signals. In a more restricted sense, the sync code and pilot signal control part of the restoration of the high-frequency component, namely the timebase correction of the transferred further narrow-band components.

The restored wide-band signal is applied to the information sink 13 which, in the case of video signals, may be a video display set or, in the case of other information, a suitable information utilization or transducing means.

The modification according to FIG. 4 of the band-joiner apparatus of FIG. 3 corresponds to the modification according to FIG. 2 of the bandsplitter apparatus of FIG. 1.

In particular, the demodulator 77 in FIG. 4 retranslates the first narrow-band signal after analog-to-digital conversion at 66 into a low-frequency component and the memory 72 separately stores pluralities of bits or elements of such retranslated low-frequency component for subsequent release to the digital-to-analog converter 91 with the aid of the timebase correction logic 71, master timing unit 74 and memory control 75. As in FIG. 1, the digital-to-analog converter 91 in FIG. 4 applies the analog version of the low-frequency component to the summing circuit 88 for recombination with the high-frequency component for the purpose of restoration of the wide-band signal.

Figure 5:
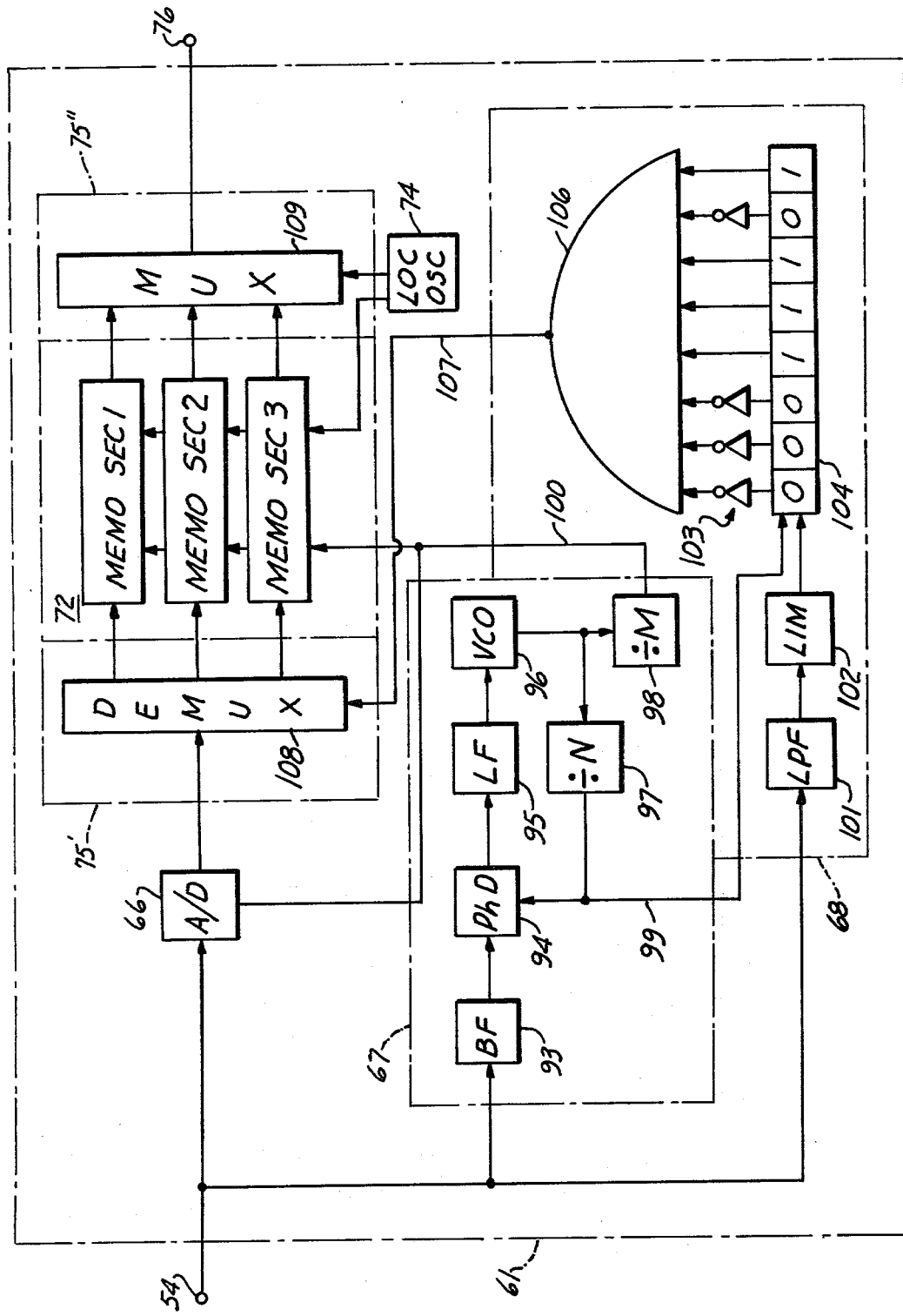
FIG. 5 is a block diagram of a synchronization, time-base correction and memory unit which may, for instance, be employed in the apparatus of FIG. 3.

FIG. 5, by way of example, shows the synchronization, timebase correction and memory unit 61 in greater detail. Apparatus identical to the unit shown in FIG. 5 may be employed at 61, 62, 63, and 64 in the band-joiner as illustrated in FIG. 3 or as modified in FIG. 4.

As before, the particular played-back, transmitted or otherwise transferred narrow-band signal with pilot tone and synchronization information proceeds via band-joiner input terminal 54 to the analog-to-digital converter 66, phase-locked loop 67 and sync detector 68.

A band-pass filter 93 extracts the pilot tone from the incoming narrow-band signal, and applies such pilot tone to a first input of a phase detector 94 in the phase-locked loop 67. The output of the phase detector 94 is applied through a compensator network or loop filter 95 to the input of a voltage-controlled oscillator 96.

The output of the voltage-controlled oscillator 96 is applied to dividers 97 and 98. The divider 97 is a divide-by-N counter which applies the divided signal to the second input of the phase detector 94 and to a first output lead 99 of the phase-locked loop. By way of example, the divisor N of the counter 97 may be such as to divide the frequency of the output signal of the voltage-controlled oscillator 96 to the frequency of the pilot tone.

The divider 98 in the phase-locked loop 67 is a divide-by-M counter, with M being a divisor sufficient to divide the output frequency of the voltage-controlled oscillator 96 so as to provide a clock signal for the analog-to-digital converter 66 and the memory 72. This clock or second output signal of the phase-locked loop 67 proceeds via an output line 100. By way of example, the pilot tone may be located above the frequency spectrum of each narrow-band signal, and the first output signal of the phase-locked loop 67 may act as a bit synchronizer for the sync detector 68.

The sync detector 68 has a low-pass filter 101 which recovers the sync signal from the played-back, transmitted or otherwise transferred narrow-band signal. A limiter 102 restores the square-wave shape of the detected sync signal.

The sync detector 68 has a digital matched filter 103, including a shift register 104. By way of example, the sync signal may be a binary word, such as an 8-bit Newman-Hoffman sequence. As indicated for the purpose of illustration in the stages of the shift register 104, the sync signal may be the binary word 00011101. In the matched filter 103, this binary word is hard-wired with the aid of selectively placed inverters between outputs of the shift register 104 and corresponding inputs of a NAND element 106. Whenever the sync signal contents of the shift register 104 match the hard-wired sync signal value, the NAND element 106 supplies via an output lead 107 of the sync detector 68 a synchronization pulse to a demultiplexer 108 of a memory control. In FIG. 5, the counterpart of the memory control 75 shown in FIG. 3 is a composite memory control 75' and 75" including, respectively the demultiplexer 108 and a multiplexer 109.

In the apparatus of FIG. 5, the channel memory 72 is composed of three memory sections SEC 1, SEC 2 and SEC 3. Being sequenced by the output of the sync detector 68, the demultiplexer 108 distributes or rotates the digital version of the played-back, transmitted or transferred narrow-band signal among the sections of the memory 72.

The second output of the phase-locked loop 67 operates via line 100 to clock bits or elements of the demultiplexed digital narrow-band signal into the memory sections. On the other hand, a stable frequency signal provided by a local oscillator 74 clocks such bits or elements of the narrow-band signal out of the memory sections for application to the multiplexer 109.

The multiplexer 109 is sequenced by the local oscillator 74 to combine bits or elements clocked out of the sections of the memory 72 to a timebase-corrected narrow-band signal proceeding to the output 76 of the particular unit, such as the unit 61.

Considering FIG. 5 in the light of FIG. 3, it may be noted that the block 71 in FIG. 3 is not apparent as such in FIG. 5. Rather, the timebase correction in FIG. 5 is a function proceeding from the disclosed or illustrated application of the clock provided by the phase-locked loop 67 to the sections of the memory 72, of the output signal of the sync detector 68 to the demultiplexer 108, and of the stable signals provided by the local oscillator 74 to the sections of the memory 72 and multiplexer 109.

In the course of its timebase correcting function, the stable signal applied by the local oscillator 74 to the memory 72 also closes the gaps in the particular narrow-band signal which, as disclosed above, were provided prior to recording, transmission or other transfer of the narrow-band signal in order to provide space for the pilot tone and sync signal or for other information aiding the restoration of the wide-band signal or of narrow-band signals from which the wide-band signal is regained.

Considering the memory 72 as shown in FIG. 5, it will be noted that this memory, as well as any corresponding memory in the units 62 to 64, may comprise several memory sections. In practice, this allows for a certain arbitrariness of timing in the band-joiner, since an empty memory section may always be chosen for the clocking in or storage of any plurality of narrow-band signal elements while some elements of a preceding plurality may still be in another memory section.

The subject extensive disclosure will render apparent or suggest to those skilled in the art various modifications and variations within the spirit and scope of the subject invention.

I claim:

1. A method of partitioning a wide-band signal into a plurality of separate narrow-band signals, comprising in combination the steps of:
    partitioning the wide-band signal into a low-frequency component and a high-frequency component at least partially above said low-frequency component in the spectrum of said wide-band signal;
    translating said low-frequency component into a first narrow-band signal having a band of frequencies at least partially higher than the frequencies of said low-frequency component;
    distributing sequential pluralities of elements of said high-frequency component over $(n-1)$ groups, with n being equal to the number of said plurality of separate narrow-band signals;
    separately storing each plurality of elements in each group; and
    providing separate narrow-band signals in addition to said first narrow-band signal by releasing stored pluralities of elements from said groups in an at least partially time-coincident relationship.

2. A method as claimed in claim 1, wherein:
    said low-frequency component is translated into said first narrow-band signal by modulation on a carrier.

3. A method as claimed in claim 1, wherein:
    each plurality of elements in each group is stored separately in a storage operation distinct from said distribution of sequential pluralities of elements.

4. A method as claimed in claim 1, wherein:
    said low-frequency component is subjected to an analog-to-digital conversion and is translated into said first narrow-band signal after said analog-to-digital conversion.

5. A method as claimed in claim 1, wherein:
    said low-frequency component is subjected to an analog-to-digital conversion, and is translated into a digital first narrow-band signal having said at least partially higher band of frequencies; and
    said digital first narrow-band signal is subjected to a digital-to-analog conversion.

6. A method as claimed in claim 1, wherein:
    said high-frequency component is subjected to an analog-to-digital conversion; and
    said distribution of sequential pluralities of elements of said high-frequency component is effected after said analog-to-digital conversion.

7. A method as claimed in claim 1, wherein:
    said high-frequency component is subjected to an analog-to-digital conversion;
    said distribution of sequential pluralities of elements of said high-frequency component and said separate storing of each plurality of elements in each group are effected after said analog-to-digital conversion; and
    said stored pluralities of elements are released from said groups in digital form and are subjected to a digital-to-analog conversion.

8. A method as claimed in claim 1, including the steps of:
    providing time gaps in each of said separate narrow-band signals between released pluralities of elements; and
    providing in said time gaps information for restoring said wide-band signal from said narrow-band signals.

9. A method as claimed in claim 1, including the steps of:
    storing one of said low-frequency component and first narrow-band signal; and
    releasing said one of said low-frequency component and first narrow-band signal in an at least partially time-coincident relationship with said narrow-band signals.

10. A method of partitioning a wide-band signal into a plurality of separate narrow-band signals, comprising in combination the steps of:

partitioning the wide-band signal into a low-frequency component and a high-frequency component at least partially above said low-frequency component in the spectrum of said wide-band signal;

translating said low-frequency component into a first narrow-band signal;

distributing sequential pluralities of elements of said high-frequency component over $(n-1)$ groups, with n being equal to the number of said plurality of separate narrow-band signals;

separately storing each plurality of elements in each group;

providing separate further narrow-band signals in addition to said first narrow-band signal by releasing stored pluralities of elements from said groups in an at least partially time-coincident relationship; and placing said first narrow-band signal into an at least partially time-coincident relationship with said further narrow-band signals.

11. A method as claimed in claim 10, wherein:
said low-frequency component is translated into said first narrow-band signal by modulation on a carrier.

12. A method as claimed in claim 10, wherein:
each plurality of elements in each group is stored separately in a storage operation distinct from said distribution of sequential pluralities of elements.

13. A method as claimed in claim 10, wherein:
said low-frequency component is subjected to an analog-to-digital conversion and is translated into said first narrow-band signal after said analog-to-digital conversion.

14. A method as claimed in claim 10, wherein:
said low-frequency component is subjected to an analog-to-digital conversion, and is translated into a digital first narrow-band signal having said at least partially higher band of frequencies; and
said digital first narrow-band signal is subjected to a digital-to-analog conversion.

15. A method as claimed in claim 10, wherein:
said high-frequency component is subjected to an analog-to-digital conversion; and
said distribution of sequential pluralities of elements of said high-frequency component is effected after said analog-to-digital conversion.

16. A method as claimed in claim 10, wherein:
said high-frequency component is subjected to an analog-to-digital conversion;
said distribution of sequential pluralities of elements of said high-frequency component and said separate storing of each plurality of elements in each group are effected after said analog-to-digital conversion; and
said stored pluralities of elements are released from said groups in digital form and are subjected to a digital-to-analog conversion.

17. A method as claimed in claim 10, including the steps of:
providing time gaps in each of said further narrow-band signals between released pluralities of elements; and
providing in said time gaps information for restoring said wide-band signal from said narrow-band signals.

18. A method as claimed in claim 10, wherein:
said placing of said first narrow-band signal into an at least partially time-coincident relationship with said further narrow-band signals includes the steps of storing one of said low-frequency component and first narrow-band signal, and releasing said one of said low-frequency component and first narrow-band signal.

19. A method of partitioning a wide-band signal into a plurality of separate narrow-band signals, comprising in combination the steps of:

partitioning the wide-band signal into a low-frequency component and a high-frequency component at least partially above said low-frequency component in the spectrum of said wide-band signal;

translating said low-frequency component into an alternating-current signal having a band of frequencies at least partially higher than the frequencies of said low-frequency component and narrower than the spectrum of said wide-band signal;

storing sequential pluralities of elements of said alternating-current signal;

releasing said stored sequential pluralities of elements of said alternating-current signal to provide a first narrow-band signal;

distributing sequential pluralities of elements of said high-frequency component over $(n-1)$ groups, with n being equal to the number of said plurality of separate narrow-band signals;

separately storing each plurality of elements in each group; and providing separate narrow-band signals in addition to said first narrow-band signal by releasing stored pluralities of elements from said groups in an at least partially time-coincident relationship.

20. A method as claimed in claim 19, wherein:
said low-frequency component is translated into said alternating-current signal by modulation on a carrier.

21. A method as claimed in claim 19, wherein:
each plurality of elements in each group is stored separately in a storage operation distinct from said distribution of sequential pluralities of elements.

22. A method as claimed in claim 19, wherein:
said low-frequency component is subjected to an analog-to-digital conversion and is translated into said alternating-current signal after said analog-to-digital conversion.

23. A method as claimed in claim 19, wherein:
said low-frequency component is subjected to an analog-to-digital conversion, and is translated into a digital alternating-current signal having said at least partially higher band of frequencies;
sequential pluralities of elements of said digital alternating-current signal are stored;
stored sequential pluralities of elements of said digital alternating-current signal are released to provide a digital first narrow-band signal; and
said digital first narrow-band signal is subjected to a digital-to-analog conversion.

24. A method as claimed in claim 19, wherein:
said high-frequency component is subjected to an analog-to-digital conversion; and
said distribution of sequential pluralities of elements of said high-frequency component is effected after said analog-to-digital conversion.

25. A method as claimed in claim 19, wherein:

said high-frequency component is subjected to an analog-to-digital conversion;

said distribution of sequential pluralities of elements of said high-frequency component and said separate storing of each plurality of elements in each groups are effected after said analog-to-digital conversion; and said stored pluralities of elements are released from said groups in digital form and are subjected to a digital-to-analog conversion.

26. A method as claimed in claim 19, including the steps of:

providing time gaps in each narrow-band signal between released pluralities of elements; and providing in said time gaps information for restoring said wide-band signal from said separate narrow-band signals.

27. A method of partitioning a wide-band signal into a plurality of separate narrow-band signals, comprising in combination the steps of:

partitioning the wide-band signal into a low-frequency component and a high-frequency component at least partially above said low-frequency component in the spectrum of said wide-band signal;

storing sequential pluralities of elements of said low-frequency component;

releasing said stored sequential pluralities of elements of said low-frequency component;

translating said released sequential pluralities of elements of said low-frequency component into a first narrow-band signal having a band of frequencies at least partially higher than the frequencies of said low-frequency component;

distributing sequential pluralities of elements of said high-frequency component over $(n-1)$ groups, with n being equal to the number of said plurality of separte narrow-band signals;

separately storing each plurality of elements in each group; and providing separate narrow-band signals in addition to said first narrow-band signal by releasing stored pluralities of elements from said groups in an at least partially time-coincident relationship.

28. A method as claimed in claim 27, wherein:

said released sequential pluralities of elements of said low-frequency component are translated into said first narrow-band signal by modulation on a carrier.

29. A method as claimed in claim 27, wherein:

each plurality of elements in each group is stored separately in a storage operation distinct from said distribution of sequential pluralities of elements.

30. A method as claimed in claim 27, wherein:

said low-frequency component is subjected to an analog-to-digital conversion and said sequential pluralities of elements of said low-frequency component are stored after said analog-to-digital conversion.

31. A method as claimed in claim 27, wherein:

said high-frequency component is subjected to an analog-to-digital conversion; and said distribution of sequential pluralities of elements of said high-frequency component is effected after said analog-to-digital conversion.

32. A method as claimed in claim 27, wherein:

said high-frequency component is subjected to an analog-to-digital conversion;

said distribution of sequential pluralities of elements of said high-frequency component and said separate storing of each plurality of elements in each group are effected after said analog-to-digital conversion; and said stored pluralities of elements are released from said groups in digital form and are subjected to a digital-to-analog conversion.

33. A method as claimed in claim 27, including the steps of:

providing time gaps in said first narrow-band signal between released and translated pluralities of elements of said low-frequency component;

providing time gaps in each narrow-band signal between pluralities of elements released from said groups; and providing in said time gaps information for restoring said wide-band signal from said narrow-band signals.

34. A method of partitioning a wide-band signal into a plurality of separate narrow-band signals, comprising in combination the steps of:

partitioning the wide-band signal into a low-frequency component and a high-frequency component at least partially above said low-frequency component in the spectrum of said wide-band signal;

translating said low-frequency component into a first narrow-band signal having a band of frequencies at least partially higher than the frequencies of said low-frequency component; and partitioning said high-frequency component into at least two separate further narrow-band signals each having a bandwidth smaller than the bandwidth of said high-frequency component.

35. A method as claimed in claim 34, wherein:

said low-frequency component is translated into said first narrow-band signal by modulation on a carrier.

36. A method as claimed in claim 34, wherein:

said low-frequency component is subjected to an analog-to-digital conversion and is translated into said first narrow-band signal after said analog-to-digital conversion.

37. A method as claimed in claim 34, wherein:

said low-frequency component is subjected to an analog-to-digital conversion, and is translated into a digital first narrow-band signal having said at least partially higher band of frequencies; and said digital first narrow-band signal is subjected to a digital-to-analog conversion.

38. A method as claimed in claim 34, wherein:

said high-frequency component is subjected to an analog-to-digital conversion and is partioned into said separate further narrow-band signals after said analog-to-digital conversion.

39. A method as claimed in claim 34, wherein:

said high-frequency component is subjected to an analog-to-digital conversion and is partitioned into at least two digital narrow-band signals; and said digital narrow-band signals are subjected to a digital-to-analog conversion.

40. A method as claimed in claim 34, including the steps of:

providing time gaps in said first and further narrow-band signals; and providing in said time gaps information for restoring said wide-band signal from said first and further narrow-band signals.

41. A method of partitioning a wide-band signal into a plurality of separate narrow-band signals, comprising in combination the steps:

distributing sequential pluralities of elements of said wide-band signal over a plurality of groups in a distribution operation;

separately storing each plurality of elements in each group in a storage operation distinct from said distribution operation; and providing separate narrow-band signals by separately releasing stored pluralities of elements from said groups in at least partially time-coincident relationship.

42. A method as claimed in claim 41, wherein:

elements of said wide-band signal are subjected to analog-to-digital conversion;

said distribution of sequential pluralities of elements includes the step of distributing sequential pluralities of elements of said wide-band signal in digital form over a plurality of groups in a distribution operation;

said separate storage of each plurality of elements includes the step of separately storing each plurality of elements in each group in digital form in a storage operation distinct from said distribution operation; and said provision of separate narrow-band signals includes the step of separately releasing stored pluralities of elements from said groups in digital form in an at least partially time-coincident relationship.

43. A method as claimed in claim 42, including the step of:

subjecting said released pluralities of elements to a digital-to-analog conversion.

44. A method as claimed in claim 41, including the steps of:

providing said separate narrow-band signals with time gaps between released pluralities of elements; and providing in said time gaps information for restoring said wide-band signal from said narrow-band signals.

45. A method of transferring a wide-band signal via a plurality of separate narrow-band signals, comprising in combination the steps of:

partitioning the wide-band signal into a low-frequency component and a high-frequency component at least partially above said low-frequency component in the spectrum of said wide-band signal;

translating said low-frequency component into a first narrow-band signal having a band of frequencies at least partially higher than the frequencies of said low-frequency component;

distributing sequential pluralities of elements of said high-frequency component over (n−1) groups, with n being equal to the number of said plurality of separate narrow-band signals;

separately storing each plurality of elements in each group;

providing separate further narrow-band signals in addition to said first narrow-band signal by releasing stored pluralities of elements from said groups in an at least partially time-coincident relationship;

transferring said first and further narrow-band signals through data channels;

receiving said transferred first and further narrow-band signals from said data channels; and reproducing said wide-band signal from said received first and further narrow-band signals.

46. A method as claimed in claim 45, wherein:

each plurality of elements in each group is stored separately in a storage operation distinct from said distribution of sequential pluralities of elements.

47. A method as claimed in claim 45, including the steps of:

storing one of said low-frequency component and first narrow-band signal; and releasing said one of said low-frequency component and first narrow-band signal in an at least partially time-coincident relationship with said further narrow-band signals.

48. A method as claimed in claim 45, including the steps of:

providing time gaps in each of said separate narrow-band signals between released pluralities of elements;

providing in said time gaps information for restoring said wide-band signal from said narrow-band signals;

transferring said restoring information in said time gaps through said data channels;

receiving said restoring information from said data channels; and reproducing said wide-band signal from said received first and further narrow-band signals with the aid of said received restoring information.

49. A method of transferring a wide-band signal via a plurality of separate narrow-band signals, comprising in combination the steps of:

partitioning the wide-band signal into a low-frequency component and a high-frequency component at least partially above said low-frequency component in the spectrum of said wide-band signal;

translating said low-frequency component into a first narrow-band signal;

distributing sequential pluralities of elements of said high-frequency component over (n−1) groups, with n being equal to the number of said plurality of separate narrow-band signals;

separately storing each plurality of elements in each group;

providing separate further narrow-band signals in addition to said first narrow-band signal by releasing stored pluralities of elements from said groups in an at least partially time-coincident relationship;

placing said first narrow-band signal into an at least partially time-coincident relationship with said further narrow-band signals;

transferring said at least partially time-coincident first and further narrow-band signals through data channels;

receiving said transferred first and further narrow-band signals from said data channels; and reproducing said wide-band signal from said received first and further narrow band signals.

50. A method as claimed in claim 49, wherein:

each plurality of elements in each group is stored separately in a storage operation distinct from said distribution of sequential pluralities of elements.

51. A method as claimed in claim 49, wherein:

said placing of said first narrow-band signal into an at least partially time-coincident relationship with said further narrow-band signals includes the steps of storing one of said low-frequency component and first narrow-band signal, and releasing said one of said low-frequency component and first narrow-band signal.

52. A method as claimed in claim 49, including the steps of:
providing time gaps in each of said further narrow-band signals between released pluralities of elements;
providing in said time gaps information for restoring said wide-band signal from said narrow-band signals;
transferring said restoring information in said time gaps through said data channels;
receiving said restoring information from said data channels; and
reproducing said wide-band signal from said received first and further narrow-band signals with the aid of said received restoring information.

53. A method of transferring a wide-band signal via a plurality of separate narrow-band signals, comprising in combination the steps of:
partitioning the wide-band signal into a low-frequency component and a high-frequency component at least partially above said low-frequency component in the spectrum of said wide-band signal;
translating said low-frequency component into an alternating current signal having a band of frequencies at least partially higher than the frequencies of said low-frequency component and narrower than the spectrum of said wide-band signal;
storing sequential pluralities of elements of said alternating-current signal;
releasing said stored sequential pluralities of elements of said alternating-current signal to provide a first narrow-band signal;
distributing sequential pluralities of elements of said high-frequency component over (n - 1) groups, with n being equal to the number of said plurality of separate narrow-band signals;
separately storing each plurality of elements in each group;
providing separate further narrow-band signals in addition to said first narrow-band signal by releasing stored pluralities of elements from said groups in an at least partially time-coincident relationship;
transferring said first and further narrow-band signals through data channels;
receiving said transferred first and further narrow-band signals from said data channels; and
reproducing said wide-band signal from said received first and further narrow-band signals.

54. A method as claimed in claim 53, wherein:
each plurality of elements in each group is stored separately in a storage operation distinct from said distribution of sequential pluralities of elements.

55. A method as claimed in claim 53, including the steps of:
providing time gaps in each narrow-band signal between released pluralities of elements;
providing in said gaps information for restoring said wide-band signal from said separate narrow-band signals;
transferring said restoring information in said time gaps through said data channels;
receiving said restoring information from said data channels; and
reproducing said wide-band signal from said received first and further narrow-band signals with the aid of said received restoring information.

56. A method of transferring a wide-band signal via a plurality of separate narrow-band signals, comprising in combination the steps of:
partitioning the wide-band signal into a low-frequency component and a high-frequency component at least partially above said low-frequency component in the spectrum of said wide-band signal;
storing sequential pluralities of elements of said low-frequency component;
releasing said stored sequential pluralities of elements of said low-frequency component;
translating said released sequential pluralities of elements of said low-frequency component into a first narrow-band signal having a band of frequencies at least partially higher than the frequencies of said low-frequency component;
distributing sequential pluralities of elements of said high-frequency component over $(n-1)$ groups, with n being equal to the number of said plurality of separate narrow-band signals;
separately storing each plurality of elements in each group;
providing separate further narrow-band signals in addition to said first narrow-band signal by releasing stored pluralities of elements from said groups in an at least partially time-coincident relationship;
transferring said first and further narrow-band signals through data channels;
receiving said transferred first and further narrow-band signals from said data channels; and
reproducing said wide-band signal from said received first and further narrow-band signals.

57. A method as claimed in claim 56, wherein:
each plurality of elements in each group is stored separately in a storage operation distinct from said distribution of sequential pluralities of elements.

58. A method as claimed in claim 56, including the steps of:
providing time gaps in said first narrow-band signal between released and translated pluralities of elements of said low-frequency component;
providing time gaps in each narrow-band signal between pluralities of elements released from said groups; and
providing in said time gaps information for restoring said wide-band signal from said narrow-band signals;
transferring said restoring information in said time gaps through said data channels;
receiving said restoring information from said data channels; and
reproducing said wide-band signal from said received first and further narrow-band signals with the aid of said received restoring information.

59. A method of transferring a wide-band signal via a plurality of separate narrow-band signals, comprising in combination the steps of:
partitioning the wide-band signal into a low-frequency component and a high-frequency component at least partially above said low-frequency component in the spectrum of said wide-band signal;

translating said low-frequency component into a first narrow-band signal having a band of frequencies at least partially higher than the frequencies of said low-frequency component;

partitioning said high-frequency component into at least two separate further narrow-band signals each having a bandwidth smaller than the bandwidth of said high-frequency component;

transferring said first and further narrow-band signals through data channels;

receiving said transferred first and further narrow-band signals from said data channels; and reproducing said wide-band signal from said received first and further narrow-band signals.

60. A method as claimed in claim 59, including the steps of:

providing time gaps in said first and further narrow-band signals;

providing in said time gaps information for restoring said wide-band signal from said first and further narrow-band signals;

transferring said restoring information in said time gaps through said data channels;

receiving said restoring information from said data channels; and reproducing said wide-band signal from said received first and further narrow-band signals with the aid of said received restoring information.

61. A method of transferring a wide-band signal via a plurality of separate narrow-band signals, comprising in combination the steps of:

distributing sequential pluralities of elements of said wide-band signal over a plurality of groups in a distribution operation;

separately storing each plurality of elements in each group in a storage operation distinct from said distribution operation;

providing separate narrow-band signals by releasing stored pluralities of elements from said groups in an at least partially time-coincident relationship;

transferring said separate narrow-band signals through data channels;

receiving said transferred narrow-band signals from said data channels; and reproducing said wide-band signal from said received narrow-band signals.

62. A method as claimed in claim 61, including the steps of:

providing said separate narrow-band signals with time gaps between released pluralities of elements;

providing in said time gaps information for restoring said wide-band signal from said narrowband signals;

transferring said restoring information in said time gaps through said data channels;

receiving said restoring information from said data channels; and reproducing said wide-band signal from said received narrow-band signals with the aid of said received restoring information.

63. A method of reproducing a wide-band signal from a plurality of separate narrow-band signals obtained by partitioning a wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, distributing sequential pluralities of elements of said high-frequency component over (n−1) groups with n being equal to the number of said plurality of separate narrow-band signals, separately storing each plurality of elements in each group, and providing separate narrow-band signals in addition to said first narrow-band signal by releasing stored pluralities of elements from said groups in an at least partially time-coincident relationship, with said first and further narrow-band signals having been transferred through data channels; said method comprising the steps of:

receiving said transferred first and further narrow-band signals from said data channels;

retranslating said received first narrow-band signal into a resulting low-frequency component;

separately storing pluralities of elements of said received further narrow-band signals;

releasing and combining stored pluralities of elements of said received further narrow-band signals to restore said high-frequency component; and restoring said wide-band signal by combining said restored high-frequency component with said resulting low-frequency component.

64. A method as claimed in claim 63, wherein:

said stored pluralities of elements of said received further narrow-band signals are combined to said high-frequency component in a signal combining operation; and said pluralities of elements of said received further narrow-band signals are separately stored in a storage operation distinct from said signal combining operation.

65. A method as claimed in claim 63, including the steps of:

providing time gaps in each narrow-band signal prior to said transfer through data channels;

providing in said time gaps, prior to said transfer, information for restoring said wide-band signal from said narrow-band signals;

transferring said restoring information in said time gaps; and controlling the provision of said resulting low-frequency component and the restoration of said high-frequency component with said restoring information.

66. A method of reproducing a wide-band signal from a plurality of separate narrow-band signals, obtained by partitioning a wide-band signal into a low-frequency component and a high-frequency component at least partially above said low-frequency component in the spectrum of said wide-band signal, translating said low-frequency component into an alternating-current signal having a band of frequencies at least partially higher than the frequencies of said low-frequency component and narrower than the spectrum of said wide-band signal, storing sequential pluralities of elements of said alternating-current signal, releasing said stored sequential pluralities of elements of said alternating-current signal to provide a first narrow-band signal, distributing sequential pluralities of elements of said high-frequency component over (n−1) groups, with n being equal to the number of said plurality of separate narrow-band signals, separately storing each plurality of elements in each group, and providing separate further narrow-band signals in addition to said first narrow-band signal by releasing stored pluralities of elements from said groups in an at least partially time-coincident relationship, with said first and further narrow-band signals having been transferred through data channels; said method comprising the steps of:

receiving said transferred first and further narrow-band signals;

separately storing pluralities of elements of said received first and further narrow-band signals;

separately releasing said stored pluralities of elements of said received first and further narrow-band signals;

translating released pluralities of elements of the received first narrow-band signal into a resulting low-frequency component;

combining released pluralities of elements of the received further narrow-band signals to restore said high-frequency component; and restoring said wide-band signal by combining said restored high-frequency component with said resulting low-frequency component.

67. A method as claimed in claim 66, wherein:

said released pluralities of elements of said received further narrow-band signals are combined to said high-frequency component in a signal combining operation; and said pluralities of elements of said received narrow-band signals are separately stored in a storage operation distinct from said signal combining operation.

68. A method as claimed in claim 66, including the steps of:

providing time gaps in each narrow-band signal prior to said transfer through data channels;

providing in said time gaps, prior to said transfer, information for restoring said wide-band signal from said narrow-band signals;

transferring said restoring information in said time gaps; and controlling the provision of said resulting low-frequency component and the restoration of said high-frequency component with said restoring information.

69. A method of reproducing a wide-band signal from a plurality of separate narrow-band signals, obtained by partitioning a wide-band signal into a low-frequency component and a high-frequency component at least partially above said low-frequency component in the spectrum of said wide-band signal, storing sequential pluralities of elements of said low-frequency component, releasing said stored sequential pluralities of elements of said low-frequency component, translating said released sequential pluralities of elements of said low-frequency component into a first narrow-band signal having a band of frequencies at least partially higher than the frequencies of said low-frequency component, distributing the sequential pluralities of elements of said high-frequency component over (n−1) groups, with n being equal to the number of said plurality of separate narrow-band signals, separately storing each plurality of elements in each group, and providing separate further narrow-band signals in addition to said first narrow-band signal by releasing stored pluralities of elements from said groups in an at least partially time-coincident relationship, with said first and further narrow-band signals having been transferred through data channels; said method comprising the steps of:

receiving said transferred first and further narrow-band signals;

retranslating said received first narrow-band signal into a low-frequency component;

separately storing pluralities of elements of said low-frequency component and of said received further narrow-band signals;

separately releasing pluralities of elements of said stored low-frequency component and further narrow-band signals in an at least partially time-coincident relationship;

combining released pluralities of elements of the received further narrow-band signals to restore said high-frequency component; and restoring said wide-band signal by combining said restored high-frequency component with said released low-frequency component.

70. A method as claimed in claim 69, wherein:

said released pluralities of elements of said received further narrow-band signals are combined to said high-frequency component in a signal combining operation; and said pluralities of elements of said received narrow-band signals are separately stored in a storage operation distinct from said signal combining operation.

71. A method as claimed in claim 69, including the steps of:

providing time gaps in each narrow-band signal prior to said transfer through data channels;

providing in said time gaps, prior to said transfer, information for restoring said wide-band signal from said narrow-band signals;

transferring said restoring information in said time gaps; and controlling at least the restoration of said high-frequency component with said restoring information.

72. A method of reproducing a wide-band signal from a plurality of separate narrow-band signals obtained by partitioning a wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, and partitioning said high-frequency component into at least two separate further narrow-band signals each having a bandwidth smaller than the bandwidth of said high-frequency component, with said first and further narrow-band signals having been transferred through data channels; said method comprising the steps of:

receiving said transferred first and further narrow-band signals from said data channels;

retranslating said received first narrow-band signal into a resulting low-frequency component;

recombining said received further narrow-band signals into a high-frequency component; and combining said resulting low-frequency component and recombined high-frequency component into a wide-band signal.

73. A method as claimed in claim 72, including the steps of:

providing time gaps in each narrow-band signal prior to said transfer through data channels;

providing in said time gaps, prior to said transfer, information for restoring said wide-band signal from said narrow-band signals;

transferring said restoring information in said time gaps; and controlling at least part of the restoration of said wide-band signal with the aid of said transferred restoring information.

74. A method of reproducing a wide-band signal from a plurality of separate narrow-band signals obtained by distributing sequential pluralities of elements of said wide-band signal over a plurality of groups, separately storing each plurality of elements in each group, and releasing stored pluralities of elements from said groups in an at least partially time-coincident relationship to provide said separate narrow-band signals, with said separate narrow-band signals having been transferred through data channels; said method comprising the steps of:
   receiving said transferred separate narrow-band signals;
   separately storing pluralities of elements of said received narrow-band signals; and
   releasing and combining stored pluralities of elements of said received narrow-band signals to restore said wide-band signal.

75. A method as claimed in claim 74, wherein:
said stored pluralities of elements of said received narrow-band signals are combined to said wide-band signal in a signal combining operation; and
said pluralities of elements of said received narrow-band signals are separately stored in a storage operation distinct from said signal combining operation.

76. A method as claimed in claim 74, including the steps of:
providing time gaps in each narrow-band signal prior to said transfer through data channels;
providing in said time gaps, prior to said transfer, information for restoring said wide-band signal from said narrow-band signals;
transferring said restoring information in said time gaps; and
controlling at least part of the restoration of said wide-band signal with said restoring information.

77. Apparatus for partitioning a wide-band signal into a plurality of separate narrow-band signals, comprising in combination:
   means for partitioning the wide-band signal into a low-frequency component and a high-frequency component at least partially above said low-frequency component in the spectrum of said wide-band signal;
   means connected to said partitioning means for translating said low-frequency component into a first narrow-band signal having a band of frequencies at least partially higher than the frequencies of said low-frequency component;
   means connected to said partitioning means for distributing sequential pluralities of elements of said high-frequency component over (n−1) groups, with n being equal to the number of said plurality of separate narrow-band signals;
   means connected to said distributing means for separately storing each plurality of elements in each group; and
   means connected to said storing means for providing separate narrow-band signals in addition to said first narrow-band signal by releasing stored pluralities of elements from said groups in an at least partially time-coincident relationship.

78. Apparatus as claimed in claim 77, wherein:
said translating means include means for modulating said low-frequency component on a carrier.

79. Apparatus as claimed in claim 77, wherein:
said storing means are distinct from said distributing means.

80. Apparatus as claimed in claim 77, including:
means connected to said partitioning means for subjecting said low-frequency component to an analog-to-digital conversion prior to translation into said first narrow-band signal.

81. Apparatus as claimed in claim 77, including:
means connected to said partitioning means for subjecting said low-frequency component to an analog-to-digital conversion;
means in said translating means for translating said converted low-frequency component into a digital first narrow-band signal having said at least partially higher band of frequencies; and
means for subjecting said digital first narrow-band signal to a digital-to-analog conversion.

82. Apparatus as claimed in claim 77, including:
means connected to said partitioning means for subjecting said high-frequency component to an analog-to-digital conversion prior to said distribution of sequential pluralities of elements of said high-frequency component.

83. Apparatus as claimed in claim 77, including:
means connected to said partitioning means for subjecting said high-frequency component to an analog-to-digital conversion prior to said distribution of sequential pluralities of elements of said high-frequency component and said separate storing of each plurality of elements in each group; and
means in said narrow-band signal providing means for releasing said stored pluralities of elements from said groups in digital form.

84. Apparatus as claimed in claim 77, including:
means for providing time gaps in each of said separate narrow-band signals between released pluralities of elements; and
means for providing in said time gaps information for restoring said wide-band signal from said narrow-band signals.

85. Apparatus as claimed in claim 77, including:
means for storing one of said low-frequency component and first narrow-band signal; and
means connected to the latter storing means for releasing said one of said low-frequency component and first narrow-band signal in an at least partially time-coincident relationship with said additional narrow-band signals.

86. Apparatus for partitioning a wide-band signal into a plurality of separate narrow-band signals, comprising in combination:
   means for partitioning the wide-band signal into a low-frequency component and a high-frequency component at least partially above said low-frequency component in the spectrum of said wide-band signal;
   means connected to said partitioning means for translating said low-frequency component into a first narrow-band signal;
   means connected to said partitioning means for distributing sequential pluralities of elements of said high-frequency component over (n−1) groups, with n being equal to the number of said plurality of separate narrow-band signals;
   means connected to said distributing means for separately storing each plurality of elements in each group;

means connected to said storing means for providing separate further narrow-band signals in addition to said first narrow-band signal by releasing stored pluralities of elements from sai groups in an at least partially time-coincident relationship; and means connected to said translating means for placing said first narrow-band signal into an at least partially time-coincident relationship with said further narrow-band signals.

87. Apparatus as claimed in claim 86, wherein:
said translating means include means for modulating said low-frequency component on a carrier.

88. Apparatus as claimed in claim 86, wherein:
said storing means are distinct from said distributing means.

89. Apparatus as claimed in claim 86, including:
means connected to said partitioning means for subjecting said low-frequency component to an analog-to-digital conversion prior to translation into said first narrow-band signal.

90. Apparatus as claimed in claim 86, including:
means connected to said partitioning means for subjecting said low-frequency component to an analog-to-digital conversion;
means in said translating means for translating said converted low-frequency component into a digital first narrow-band signal having said at least partially higher band of frequencies; and
means for subjecting said digital first narrow-band signal to a digital-to-analog conversion.

91. Apparatus as claimed in claim 86, including:
means connected to said partitioning means for subjecting said high-frequency component to an analog-to-digital conversion prior to said distribution of sequential pluralities of elements of said high-frequency component.

92. Apparatus as claimed in claim 86, including:
means connected to said partitioning means for subjecting said high-frequency component to an analog-to-digital conversion prior to said distribution of sequential pluralities of elements of said high-frequency component and said separate storing of each plurality of elements in each group; and
means in said narrow-band signal providing means for releasing said stored pluralities of elements from said groups in digital form.

93. Apparatus as claimed in claim 86, including:
means for providing time gaps in each of said further narrow-band signals between releaded pluralities of elements; and
means for providing in said time gaps information for restoring said wide-band signal from said narrow band signals.

94. Apparatus as claimed in claim 86, wherein:
said means for placing said first narrow-band signal into an at least partially time-coincident relationship with said further narrow-band signals include means for storing one of said low-frequency component and first narrow-band signal, and releasing said one of said low-frequency component and first narrow-band signal.

95. Apparatus for partitioning a wide-band signal into a plurality of separate narrow-band signals, comprising in combination:
means for partitioning the wide-band signal into a low-frequency component and a high-frequency component at least partially above said low-frequency component in the spectrum of said wide-band signal;
means connected to said partitioning means for translating said low-frequency component into an alternating-current signal having a band of frequencies at least partially higher than the frequencies of said low-frequency component and narrower than the spectrum of said wide-band signal;
means connected to said translating means for storing sequential pluralities of elements of said alternating-current signal;
means connected to said storing means for releasing said stored sequential pluralities of elements of said alternating-current signal to provide a first narrow-band signal;
means connected to said partitioning means for distributing sequential pluralities of elements of said high-frequency component over (n−1) groups, with n being equal to the number of said plurality of separate narrow-band signals;
means connected to said distributing means for separately storing each plurality of elements in each group; and
means connected to the latter storing means for providing separate narrow-band signals in addition to said first narrow-band signal by releasing stored pluralities of elements from said groups in an at least partially time-coincident relationship.

96. Apparatus as claimed in claim 95, wherein:
said translating means include means for modulating low-frequency component on a carrier to produce said alternating-current signal.

97. Apparatus as claimed in claim 95, wherein:
said means for separately storing each plurality of elements in each group are distinct from said means for distributing said sequential pluralities of elements.

98. Apparatus as claimed in claim 95, including:
means connected to said partitioning means for subjecting said low-frequency component to an analog-to-digital conversion prior to translation into said first narrow-band signal.

99. Apparatus as claimed in claim 95, including:
means connected to said partitioning means for subjecting said low-frequency component to an analog-to-digital conversion;
means in said translating means for translating said low-frequency component into a digital alternating-current signal having said at least partially higher band of frequencies;
means in said storing means for storing sequential pluralities of elements of said digital alternating-current signal;
means in said releasing means for releasing stored sequential pluralities of elements of said digital alternating-current signal to provide a digital first narrow-band signal; and
means for subjecting said digital first narrow-band signal to a digital-to-analog conversion.

100. Apparatus as claimed in claim 95, including
means connected to said partitioning means for subjecting said high-frequency component to an analog-to-digital conversion prior to said distribution of sequential pluralities of elements of said high-frequency component.

101. Apparatus as claimed in claim 95, including:
means connected to said partitioning means for subjecting said high-frequency component to an analog-to-digital conversion prior to said distribution of sequential pluralities of elements of said high-frequency component and said separate storing of each plurality of elements in each group; and means in said narrow-band signal providing means for releasing said stored pluralities of elements from said groups in digital form.

102. Apparatus as claimed in claim 95, including:

means for providing time gaps in each of said separate narrow-band signals between released pluralities of elements; and means for providing in said time gaps information for restoring said wide-band signal from said narrow-band signals.

103. Apparatus for partitioning a wide-band signal into a plurality of separate narrow-band signals, comprising in combination:

means for partitioning the wide-band signal into a low-frequency component and a high-frequency component at least partially above said low-frequency component in the spectrum of said wide-band signal;

means connected to said partitioning means for storing sequential pluralities of elements of said low-frequency component;

means connected to said storing means for releasing said stored sequential pluralities of elements of said low-frequency component;

means connected to said storing means for translating said released sequential pluralities of elements of said low-frequency component into a first narrow-band signal having a band of frequencies at least partially higher than the frequencies of said low-frequency component;

means connected to said partitioning means for distributing sequential pluralities of elements of said high-frequency component over (n−1) groups, with n being equal to the number of said plurality of separate narrow-band signals;

means connected to said distributing means for separately storing each plurality of elements in each group; and means connected to the latter storing means for providing separate narrow-band signals in addition to said first narrow-band signal by releasing stored pluralities of elements from said groups in an at least partially time-coincident relationship.

104. Apparatus as claimed in claim 103, wherein:

ssaid translating means include means for modulating released sequential pluralities of elements of said low-frequency component on a carrier to produce said first narrow-band signal.

105. Apparatus as claimed in claim 103, wherein:

said means for separately storing each plurality of elements in each group are distinct from said means for distributing said sequential pluralities of elements.

106. Apparatus as claimed in claim 103, including:

means connected to said partitioning means for subjecting said low-frequency component to an analog-to-digital conversion prior to said storage of sequential pluralities of elements of said low-frequency.

107. Apparatus as claimed in claim 103, including:

means connected to said partitioning means for subjecting said high-frequency component to an analog-to-digital conversion prior to said distribution of sequential pluralities of elements of said high-frequency component.

108. Apparatus as claimed in claim 103, including:

means connected to said partitioning means for subjecting said high-frequency component to an analog-to-digital conversion prior to said distribution of sequential pluralities of elements of said high-frequency component and said separate storing of each plurality of elements in each group; and means in said narrow-band signal providing means for releasing said stored pluralities of elements from said groups in digital form.

109. Apparatus as claimed in claim 103, including:

means for providing time gaps in said first narrow-band signal between released and translated pluralities of elements of said low-frequency component;

means for providing time gaps in each additional narrow-band signal between pluralities of elements released from said groups; and means for providing in said time gaps information for restoring said wide-band signal from said narrow-band signals.

110. Apparatus for partitioning a wide-band signal into a plurality of separate narrow-band signals, comprising in combination:

means for partitioning the wide-band signal into a low-frequency component and a high-frequency component at least partially above said low-frequency component in the spectrum of said wide-band signal;

means connected to said partitioning means for translating said low-frequency component into a first narrow-band signal having a band of frequencies at least partially higher than the frequencies of said low-frequency component; and means connected to said partitioning means for partitioning said high-frequency component into at least two separate further narrow-band signals each having a bandwidth smaller than the bandwidth of said high-frequency component.

111. Apparatus as claimed in claim 110, wherein:

said translating means include means formulating said low-frequency component on a carrier to provide said first narrow-band signal.

112. Apparatus as claimed in claim 110, including:

means connected to said partitioning means for subjecting said low-frequency component to an analog-to-digital conversion prior to translation into said first narrow-band signal.

113. Apparatus as claimed in claim 110, including:

means connected to said partitioning means for subjecting said low-frequency component to an analog-to-digital conversion;

means in said translating means for translating said converted low-frequency component into a digital first narrow-band signal having said at least partially higher band of frequencies; and means for subjecting said digital first narrow-band signal to a digital-to-analog conversion.

114. Apparatus as claimed in claim 110, including:

means connected to said partitioning means for subjecting said high-frequency component to an analog-to-digital conversion prior to said partitioning into said separate further narrow-band signals.

115. Apparatus as claimed in claim 110, including:

means connected to said partitioning means for subjecting said high-frequency component to an analog-to-digital conversion;

means in said high-frequency component partitioning means for partitioning said high-frequency component into at least two digital narrow-band signals; and means for subjecting said digital narrow-band signals to a digital-to-analog conversion.

116. Apparatus as claimed in claim 110, including:

means for providing time gaps in said first and further narrow-band signals; and means for providing in said time gaps information for restoring said wide-band signal from said first and further narrow-band signals.

117. Apparatus for partitioning a wide-band signal into a plurality of separate narrow-band signals, comprising in combination:

means for distributing sequential pluralities of elements of said wide-band signal over a plurality of groups in a distribution operation;

means connected to said distributing means for separately storing each plurality of elements in each group in a storage operation distinct from said distribution operation; and means connected to said storing means for providing separate narrow-band signals by separately releasing stored pluralities of elements from said groups in an at least partially time-coincident relationship.

118. Apparatus as claimed in claim 117, including:

means for subjecting elements of said wide-band signal to analog-to-digital conversion;

means in said distributing means for distributing sequential pluralities of elements of said wide-band signal in digital form over a plurality of groups in a distribution operation;

means in said storing means for separately storing each plurality of elements in each group in digital form in a storage operation distinct from said distribution operation; and means in said narrow-band signal providing means for separately releasing stored pluralities of elements from said groups in digital form in an at least partially time-coincident relationship.

119. Apparatus as claimed in claim 118, including:

means for subjecting said released pluralities of elements to a digital-to-analog conversion.

120. Apparatus as claimed in claim 117, including:

means for providing said separate narrow-band signals with time gaps between released pluralities of elements; and means for providing in said time gaps information for restoring said wide-band signal from said narrow-band signals.

121. Apparatus for transferring a wide-band signal via a plurality of separate data channels, comprising in combination:

means for partitioning the wide-band signal into a low-frequency component and a high-frequency component at least partially above said low-frequency component in the spectrum of said wide-band signal;

means connected to said partitioning means for translating said low-frequency component into a first narrow-band signal having a band of frequencies at least partially higher than the frequencies of said low-frequency component;

means connected to said partitioning means for distributing sequential pluralities of elements of said high-frequency component over (n−1) groups, with n being equal to the number of said plurality of separate narrow-band signals;

means connected to said distributing means for separately storing each plurality of elements in each group;

means connected to said storing means for providing separate further narrow-band signals in addition to said first narrow-band signal by releasing stored pluralities of elements from said groups in an at least partially time-coincident relationship;

means connected to said translating means and said further narrow-band signal providing means for transferring said first and further narrow-band signals through said separate data channels;

means connected to said data channels for receiving said transferred first and further narrow-band signals from said data channels; and means connected to said receiving means for reproducing said wide-band signal from said received first and further narrow-band signals.

122. Apparatus as claimed in claim 121, wherein:

said storing means are distinct from said distributing means.

123. Apparatus as claimed in claim 121, including:

means connected to one of said partitioning means and translating means for storing one of said low-frequency component and first narrow-band signal; and means connected to the latter storing means for releasing said one of said low-frequency component and first narrow-band signal in an at least partially time-coincident relationship with said further narrow-band signals.

124. Apparatus as claimed in claim 121, including:

means for providing time gaps in each of said separate narrow-band signals between released pluralities of elements;

means for providing in said time gaps information for restoring said wide-band signal from said narrow-band signals;

means in said transferring means for transferring said restoring information in said time gaps through said data channels;

means in said receiving means for receiving said restoring information from said data channels; and means in said reproducing means for reproducing said wide-band signal from said received first and further narrow-band signals with the aid of said received restoring information.

125. Apparatus for transferring a wide-band signal via a plurality of separate data channels, comprising in combination:

means for partitioning the wide-band signal into a low-frequency component and a high-frequency component at least partially above said low-frequency component in the spectrum of said wide-band signal;

means connected to said partitioning means for translating said low-frequency component into a first narrow-band signal;

means connected to said partitioning means for distributing sequential pluralities of elements of said high-frequency component over (n−1) groups, with n being equal to the number of said plurality of separate narrow-band signals;

means connected to said distributing means for separately storing each plurality of elements in each group;

means connected to said storing means for providing separate further narrow-band signals in addition to said first narrow-band signal by releasing stored pluralities of elements from said groups in an at least partially time-coincident relationship;

means connected to said translating means for placing said first narrow-band signal into an at least partially time-coincident relationship with said further narrow-band signals;

means connected to said translating means and said further narrow-band signal providing means for transferring said at least partially time-coincident first and further narrow-band signals through said separate data channels;

means connected to said data channels for receiving said transferred first and further narrow-band signals from said data channels; and means connected to said receiving means for reproducing said wide-band signal from said received first and further narrow-band signals.

126. Apparatus as claimed in claim 125, wherein:
said storing means are distinct from said distributing means.

127. Apparatus as claimed in claim 125, wherein:
said means for placing of said first narrow-band signal into an at least partially time-coincident relationship with said further narrow-band signals include means for storing one of said low-frequency component and first narrow-band signal, and for releasing said one of said low-frequency component and first narrow-band signal.

128. Apparatus as claimed in claim 125, including:
means for providing time gaps in each of said further narrow-band signals between released pluralities of elements;

means for providing in said time gaps information for restoring said wide-band signal from said narrow-band signals;

means in said transferring means for transferring said restoring information in said time gaps through said data channels;

means in said receiving means for receiving said restoring information from said data channels; and means in said reproducing means for reproducing said wide-band signal from said received first and further narrow-band signals with the aid of said received restoring information.

129. Apparatus for transferring a wide-band signal via a plurality of separate data channels, comprising in combination:

means for partitioning the wide-band signal into a low-frequency component and a high-frequency component at least partially above said slow-frequency component in the spectrum of said wide-band signal;

means connected to said partitioning means for translating said low-frequency component into an alternating current signal having a band of frequencies at least partially higher than the frequencies of said low-frequency component and narrower than the spectrum of said wide-band signal;

means connected to said translating means for storing sequential pluralities of elements of said alternating-current signal;

means connected to said storing means for releasing said stored sequential pluralities of elements of said alternating-current signal to provide a first narrow-band signal;

means connected to said partitioning means for distributing sequential pluralities of elements of said high-frequency component over (n−1) groups, with n being equal to the number of said plurality of separate narrow-band signals;

means connected to said distributing means for separately storing each plurality of elements in each group;

means connected to the latter storing means for providing separate further narrow-band signals in addition to said first narrow-band signal by releasing stored pluralities of elements from said groups in an at least partially time-coincident relationship;

means connected to said first narrow-band signal providing means and said further narrow-band signal providing means for transferring said first and further narrow-band signals through said separate data channels;

means connected to said data channels for receiving said transferred first and further narrow-band signals from said data channels; and means connected to said receiving means for reproducing said wide-band signal from said received first and further narrow-band signals.

130. Apparatus as claimed in claim 129, wherein:
said means for separately storing each plurality of elements in each group are distinct from said distributing means.

131. Apparatus as claimed in claim 129, including:
means for providing time gaps in each narrow-band signal between released pluralities of elements;

means for providing in said gaps information for restoring said wide-band signal from said separate narrow-band signals;

means in said transferring means for transferring said restoring information in said time gaps through said data channels;

means in said receiving means for receiving said restoring information from said data channels; and means in said reproducing means for reproducing said wide-band signal from said received first and further narrow-band signals with the aid of said received restoring information.

132. Apparatus for transferring a wide-band signal via a plurality of separate data channels, comprising in combination:

means for partitioning the wide-band signal into a low-frequency component and a high-frequency component at least partially above said low-frequency component in the spectrum of said wide-band signal;

means connected to said partitioning means for storing sequential pluralities of elements of said low-frequency component;

means connected to said storing means for releasing said stored sequential pluralities of elements of said low-frequency component;

means connected to said storing means for translating said released sequential pluralities of elements of said low-frequency component into a first narrow-band signal having a band of frequencies at least partially higher than the frequencies of said low-frequency component;

means connected to said partitioning means for distributing sequential pluralities of elements of said high-frequency component over (n−1) groups, with n being equal to the number of said plurality of separate narrow-band signals;

means connected to said distributing means for separately storing each plurality of elements in each group;

means connected to the latter storing means for providing separate further narrow-band signals in addition to said first narrow-band signal by releasing stored pluralities of elements from said groups in an at least partially time-coincident relationship;

means connected to said translating means and said further narrow-band signal providing means for transferring said first and further narrow-band signals through said separate data channels;

means connected to said data channels for receiving said transferred first and further narrow-band signal from said data channels; and means connected to said receiving means for reproducing said wide-band signal from said received first and further narrow-band signals.

133. A method as claimed in claim 132, wherein:

said means for separately storing each plurality of elements in each group are distinct from said distributing means.

134. A method as claimed in claim 132, including:

means for providing time gaps in said first narrow-band signal between released and translated pluralities of elements of said low-frequency component;

means for providing time gaps in each narrow-band signal between pluralities of elements released from said groups; and means for providing in said time gaps information for restoring said wide-band signal from said narrow-band signals;

means in said transferring means for transferring said restoring information in said time gaps through said data channels;

means in said receiving means for receiving said restoring information from said data channels; and means in said reproducing means for reproducing said wide-band signal from said received first and further narrow-band signals with the aid of said received restoring information.

135. Apparatus for transferring a wide-band signal via a plurality of separate data channels, comprising in combination:

means for partitioning the wide-band signal into a low-frequency component and a high-frequency component at least partially above said low-frequency component in the spectrum of said wide-band signal;

means connected to said translating means for translating said low frequency component into a first narrow-band signal having a band of frequencies at least partially higher than the frequencies of said low-frequency component;

means connected to said partitioning means for partitioning said high-frequency component into at least two separate further narrow-band signals each having a bandwidth smaller than the bandwidth of said high-frequency component;

means for transferring said first and further narrow-band signals through said separate data channels;

means connected to said data channels for receiving said transferred first and further narrow-band signals from said data channels; and means connected to said receiving means for reproducing said wide-band signal from said received first and further narrow-band signals.

136. Apparatus as claimed in claim 135, including:

means for providing time gaps in said first and further narrow-band signals;

means for providing in said time gaps information for restoring said wide-band signals from said first and further narrow-band signals;

means in said transferring means for transferring said restoring information in said time gaps through said data channels;

means in said receiving means for receiving said restoring information from said data channels; and means in said reproducing means for reproducing said wide-band signals from said received first and further narrow-band signals with the aid of said received restoring information.

137. Apparatus for transferring a wide-band signal via a plurality of separate narrow-band signals, comprising in combination:

means for distributing sequential pluralities of elements of said wide-band signal over a plurality of groups in a distribution operation;

means connected to, but distinct from, said distributing means for separately storing each plurality of elements in each group in a storage operation distinct from said distribution operation;

means connected to said storing means for providing separate narrow-band signals by releasing stored pluralities of elements from said groups in an at least partially time-concident relationship;

means connected to said narrow-band signal providing means for transferring said separate narrow-band signals through said separate data channels;

means connected to said data channels for receiving said transferred narrow-band signals from said data channels; and means connected to said receiving means for reproducing said wide-band signal from said received narrow-band signals.

138. A method as claimed in claim 137, including:

means for providing said separate narrow-band signals with time gaps between released pluralities of elements;

means for providing in said time gaps information for restoring said wide-band signal from said narrow-band signals;

means in said transferring means for transferring said restoring information in said time gaps through said data channels;

means connected to said data channels for receiving said restoring information from said data channels; and means in said reproducing means for reproducing said wide-band signal from said received narrow-band signals with the aid of said received restoring information.

139. Apparatus for reproducing a wide-band signal from a plurality of separate narrow-band signals obtained by partitioning a wide-band signal into a low-frequency component and a high-frequency component at least partially above said low-frequency component in the spectrum of said wide-band signal, translating said low-frequency component into a first narrow-band signal having a band of frequencies at least partially higher than the frequencies of said low-frequency component, distributing sequential pluralities of elements of said high-frequency component over (n−1) groups with n being equal to the number of said plurality of separate narrow-band signals, separately storing each plurality of elements in each group, and providing separate narrow-band signals in addition to said first narrow-band signal by releasing stored pluralities of elements from said groups in an at least partially time-coincident relationship, with said first and further narrow-band signals having been transferred through data channels; said apparatus comprising in combinaton:
- means for receiving said transferred first and further narrow-band signals from said data channels;
- means connected to said receiving means for retranslating said received first narrow-band signal into a resulting low-frequency component;
- means connected to said received means for separately storing pluralities of elements of said received further narrow-band signals;
- means connected to said storing means for releasing and combining stored pluralities of elements of said received further narrow-band signals to restore said high-frequency component; and
- means connected to said retranslating means and releasing means for restoring said wide-band signal by combining said restored high-frequency component with said resulting low-frequency component.

140. Apparatus as claimed in claim 139, wherein:
said means for separately storing pluralities of elements of said received further narrow-band signals are distinct from said means for combining stored pluralities of elements of said received further narrow-band signals.

141. Apparatus as claimed in claim 139, including:
- means for providing time gaps in each narrow-band signal prior to said transfer through data channels;
- means for providing in said time gaps, prior to said transfer, information for restoring said wide-band signal from narrow-band signals;
- means for transferring said restoring information in said time gaps; and
- means in said receiving means for controlling at least part of the provision of said resulting low-frequency component and the restoration of said high-frequency component with said restoring information.

142. Apparatus for reproducing a wide-band signal from a plurality of separate narrow-band signals, obtained by partitioning a wide-band signal into a low-frequency component and a high-frequency component at least partially above said low-frequency component in the spectrum of said wide-band signal, translating said low-frequency component into an alternating-current signal having a band of frequencies at least partially higher than the frequencies of said low-frequency component and narrower than the spectrum of said wide-band signal, storing sequential pluralities of elements of said alternating-current signal, releasing said stored sequential pluralities of elements of said alternating-current signal to provide a first narrow-band signal, distributing sequential pluralities of elements of said high-frequency component over (n−1) groups, with n being equal to the number of said plurality of separate narrow-band signals, separately storing each plurality of elements in each group, and providing separate further narrow-band signals in addition to said first narrow-band signal by releasing stored pluralities of elements from said groups in an at least partially time-coincident relarionship, with said first and further narrow-band signals having been transferred through data channels; said apparatus comprising in combination:
- means for receiving said transferred first and further narrow-band signals;
- means connected to receiving means for separately storing pluralities of elements of said received first and further narrow-band signals;
- means connected to said storing means for separately releasing said stored pluralities of elements of said received first and further narrow-band signals;
- means connected to one of said releasing means and storing means for translating released pluralities of elements of the received first narrow-band signal into a resulting low-frequency component;
- means connected to one of said releasing means and storing means for combining released pluralities of elements of the received further narrow-band signals to restore said high-frequency component; and
- means connected to said translating means and combining means for restoring said wide-band signal by combining said restored high-frequency component with said resulting low frequency component.

143. Apparatus as claimed in claim 142, wherein:
said means for separately storing pluralities of elements of said received first and further narrow-band signals are distinct from said means for combining released pluralities of elements of the received further narrow-band signals.

144. Apparatus as claimed in claim 142, including:
- means for providing time gaps in each narrow-band signal prior to said transfer through data channels;
- means for providing in said time gaps, prior to said transfer, information for restoring said wide-band signal from said narrow-band signals;
- means for transferring said restoring information in said time gaps; and
- means in said receiving means for controlling at least part of the provision of said resulting low-frequency component and the restoration of said high-frequency component with said restoring information.

145. Apparatus for reproducing a wide-band signal from a plurality of separate narrow-band signals, obtained by partitioning a wide-band signal into a low-frequency component and a high-frequency component at least partially above said low-frequency component in the spectrum of said wide-band signal, storing sequential pluralities of elements of said low-frequency component, releasing said stored sequential pluralities of elements of said low-frequency component, translating said released sequential pluralities of elements of said low-frequency component into a first narrow-band signal having a band of frequencies at least partially higher than the frequencies of said low-frequency component, distributing sequential pluralities of elements of said high-frequency component over (n−1) groups, with n being equal to the number of said plurality of separate narrow-band signals, separately storing each plurality of elements in each group, and providing separate further narrow-band signals in addition to said first narrow-band signal by releasing stored pluralities of elements from said groups in an at least partially time-coincident relationship, with said first and further narrow-band signals having been transferred through data channels; said apparatus comprising in combination:
- means for receiving said transferred first and further narrow-band signals;
- means connected to said receiving means for retranslating said received first narrow-band signal into a low-frequency component;
- means connected to said retranslating means for separately storing pluralities of elements of said low-frequency component and of said received further narrow-band signals;

means connected to said storing means for separately releasing pluralities of elements of said stored low-frequency component and further narrow-band signals in an at least partially time-coincident relationship;

means connected to one of said releasing means and storing means for combining released pluralities of elements of the received further narrow-band signals to restore said high-frequency component; and means connected to one of said releasing means and storing means and to said combining means for restoring said wide-band signal by combining said restored high-frequency component with said released low-frequency component.

146. Apparatus as claimed in claim 145, wherein:
said means for separately storing pluralities of elements of said low-frequency component and received further narrow-band signals are distinct from said means for combining released pluralities of elements of the received further narrow-band signals.

147. Apparatus as claimed in claim 145, including:
means for providing time gaps in each narrow-band signal prior to said transfer through data channels;
means for providing in said time gaps, prior to said transfer, information for restoring said wide-band signal from said narrow-band signals;
means for transferring said restoring information in said time gaps; and
means for controlling at least the restoration of said high-frequency component with said restoring information.

148. Apparatus for reproducing a wide-band signal from a plurality of separate narrow-band signals obtained by partitioning a wide-band signal into a low-frequency component and a high-frequency component at least partially above said low-frequency component in th spectrum of said wide-band signal, translating said low-frequency component into a first narrow-band signal having a band of frequencies at least partially higher than the frequencies of said low-frequency component, and partitioning said high-frequency component into at least two separate further narrow-band signals each having a bandwidth smaller than the bandwith of said high-frequency component, with said first and further narrow-band signals having been transferred through data channels; said apparatus comprising in combination:

means for receiving said transferred first and further narrow-band signals from said data channels;
means connected to said receiving means for retranslating said received first narrow-band signal into a resulting low-frequency component;
means connected to said receiving means for recombining said received further narrow-band signals into a high-frequency component; and
means connected to said retranslation means and recombining means for combining said resulting low-frequency component and recombined high-frequency component into a wide-band signal.

149. Apparatus as claimed in claim 148, including:
means for providing time gaps in each narrow-band signal prior to said transfer through data channels;
means for providing in said time gaps, prior to said transfer, information for restoring said wide-band signal from said narrow-band signals;
means for transferring said restoring information in said time gaps; and
means for controlling at least part of the restoration of said wide-band signal with the aid of said transferred restoring information.

150. Apparatus of reproducing a wide-band signal from a plurality of separate narrow-band signals obtained by distributing sequential pluralities of elements of said wide-band signal over a plurality of groups, separately storing each plurality of elements in each group, and releasing stored pluralities of elements from said groups in an at least partially time-coincident relationship to provide said separate narrow-band signals, with said separate narrow-band signals having been transferred through data channels; said apparatus comprising in combination:

means for receiving said transferred separate narrow-band signals;
means connected to said receiving means for separately storing pluralities of elements of said received narrow-band signals; and
means connected to said storing means for releasing and combining stored pluralities of elements of said received narrow-band signals to restore said wide-band signal.

151. Apparatus as claimed in claim 150, wherein:
said stored pluralities of elements of said received narrow-band signals are combined to said wide-band signal in a signal combining operation; and
said means for separately storing pluralities of elements of said received narrow-band signals are distinct from said means for combining stored pluralities of elements.

152. Apparatus as claimed in claim 150, including:
means for providing time gaps in each narrow-band signal prior to said transfer through data channels;
means for providing in said time gaps, prior to said transfer, information for restoring said wide-band signal from said narrow-band signals;
means for transferring said restoring information in said time gaps; and
means for controlling at least part of the restoration of said wide-band signal with said restoring information.

* * * * *